(12) United States Patent
Grenier et al.

(10) Patent No.: US 12,539,306 B2
(45) Date of Patent: Feb. 3, 2026

(54) MUCOADHESIVE PHARMACEUTICAL COMPOSITIONS OF CORTICOSTEROIDS

(71) Applicant: Ferring B.V., Hoofddorp (NL)

(72) Inventors: Arnaud Grenier, Hoofddorp (NL); Dario Carrara, Hoofddorp (NL)

(73) Assignee: Ferring B.V., Hoofddorp (NL)

( * ) Notice: Subject to any disclaimer, the term of this patent is extended or adjusted under 35 U.S.C. 154(b) by 1131 days.

(21) Appl. No.: 17/288,385

(22) PCT Filed: Oct. 23, 2019

(86) PCT No.: PCT/IB2019/059079
§ 371 (c)(1),
(2) Date: Apr. 23, 2021

(87) PCT Pub. No.: WO2020/084530
PCT Pub. Date: Apr. 30, 2020

(65) Prior Publication Data
US 2021/0379081 A1 Dec. 9, 2021

Related U.S. Application Data

(60) Provisional application No. 62/749,878, filed on Oct. 24, 2018.

(30) Foreign Application Priority Data

Jan. 2, 2019 (EP) ..................... 19150077

(51) Int. Cl.
*A61K 31/573* (2006.01)
*A61K 31/56* (2006.01)
(Continued)

(52) U.S. Cl.
CPC ............ *A61K 31/56* (2013.01); *A61K 31/573* (2013.01); *A61K 31/58* (2013.01); *A61K 47/10* (2013.01);
(Continued)

(58) Field of Classification Search
CPC ...... A61K 31/56; A61K 31/573; A61K 31/58; A61K 31/565
See application file for complete search history.

(56) References Cited

U.S. PATENT DOCUMENTS 5,458,879 A    10/1995  Singh et al.
7,544,348 B2   6/2009   Jacob et al.
(Continued)

FOREIGN PATENT DOCUMENTS

CA    3221213 A1 *  6/2016   ............... A61K 9/70
CL    199500327 A    2/1996
(Continued)

OTHER PUBLICATIONS

Office Action received in Mexican Application No. MX/a/2021/004537 dated Apr. 10, 2023.
(Continued)

*Primary Examiner* — Rayna Rodriguez
*Assistant Examiner* — Janet L Coppins
(74) *Attorney, Agent, or Firm* — Foley & Lardner LLP

(57) ABSTRACT

Described herein are mucoadhesive pharmaceutical compositions of corticosteroids, as well as methods of making such pharmaceutical compositions, and therapeutic methods using them. The compositions typically comprise a corticosteroid in a mucoadhesive system, wherein the mucoadhesive system comprises a rheology-modifying agent and a vehicle for the corticosteroid. The compositions are particularly useful for treating inflammatory conditions of the esophagus, such as eosinophilic esophagitis, or inflammatory bowel disease.

14 Claims, 6 Drawing Sheets

(51) Int. Cl.
*A61K 31/58* (2006.01)
*A61K 31/80* (2006.01)
*A61K 47/10* (2017.01)
*A61K 47/12* (2006.01)
*A61K 47/26* (2006.01)
*A61K 47/36* (2006.01)

(52) U.S. Cl.
CPC .............. *A61K 47/12* (2013.01); *A61K 47/26* (2013.01); *A61K 47/36* (2013.01)

(56) References Cited

U.S. PATENT DOCUMENTS

| | | | |
|---|---|---|---|
| 7,547,433 | B2 | 6/2009 | Jacob et al. |
| 8,030,003 | B2 | 10/2011 | Rothenberg |
| 8,324,192 | B2 | 12/2012 | Dohil et al. |
| 8,497,258 | B2 | 7/2013 | Dohil et al. |
| 8,545,886 | B2 | 10/2013 | Eisenreich et al. |
| 8,580,300 | B2 | 11/2013 | Wilhelm et al. |
| 8,679,545 | B2 | 3/2014 | Dohil et al. |
| 8,771,729 | B2 | 7/2014 | Perrett et al. |
| 8,975,243 | B2 | 3/2015 | Dohil et al. |
| 8,980,325 | B2 | 3/2015 | Watson et al. |
| 9,050,368 | B2 | 6/2015 | Phillips et al. |
| 9,119,863 | B2 | 9/2015 | Dohil et al. |
| 2003/0059446 | A1 | 3/2003 | Kulkarni et al. |
| 2007/0111978 | A1 | 5/2007 | Dohil et al. |
| 2010/0216754 | A1* | 8/2010 | Hill .................... A61K 31/56 514/180 |
| 2012/0164080 | A1 | 6/2012 | Hill et al. |

FOREIGN PATENT DOCUMENTS

| | | |
|---|---|---|
| CN | 101969956 A | 2/2011 |
| EP | 1 293 194 A1 | 3/2003 |
| EP | 2 306 988 | 4/2011 |
| ES | 2637447 | 10/2017 |
| ES | 2658995 | 3/2018 |
| ES | 2660141 | 3/2018 |
| JP | 2003-128586 A | 5/2003 |
| JP | 2005-533047 A | 11/2005 |
| JP | 2007-522077 A | 8/2007 |
| JP | 2008-539222 | 11/2008 |
| JP | 2011-503073 A | 1/2011 |
| JP | 2011-503113 A | 1/2011 |
| JP | 2011-529854 A | 12/2011 |
| JP | 2012-528889 A | 11/2012 |
| JP | 2015-536995 A | 12/2015 |
| JP | 2017-514843 A | 6/2017 |
| JP | 2018-515511 A | 6/2018 |
| WO | WO-96/03975 | 2/1996 |
| WO | WO-00/10527 A1 | 3/2000 |
| WO | WO-00/10529 A | 3/2000 |
| WO | WO-01/28515 A1 | 4/2001 |
| WO | WO-02/064113 | 8/2002 |
| WO | WO-2006/083390 | 8/2006 |
| WO | WO-2009/064417 | 5/2009 |
| WO | WO-2009/064457 | 5/2009 |
| WO | WO-2009/064458 | 5/2009 |
| WO | WO-2009/064460 | 5/2009 |
| WO | WO-2009/064819 | 5/2009 |
| WO | WO-2009/132048 | 10/2009 |
| WO | WO-2009/134929 | 11/2009 |
| WO | WO-2010/009961 | 1/2010 |
| WO | WO-2010/021636 | 2/2010 |
| WO | WO-2010/065557 | 6/2010 |
| WO | WO-2010/144865 | 12/2010 |
| WO | WO-2011/041509 | 4/2011 |
| WO | WO-2011/163614 | 12/2011 |
| WO | WO-2013/051928 | 4/2013 |
| WO | WO-2014/155397 | 10/2014 |
| WO | WO-2015/034678 | 3/2015 |
| WO | WO-2015/035114 | 3/2015 |
| WO | WO-2015/097053 | 7/2015 |
| WO | WO-2016/028979 | 2/2016 |
| WO | WO-2016/145407 A1 | 9/2016 |
| WO | WO-2019/207059 A1 | 10/2019 |

OTHER PUBLICATIONS

Aceves S, et al. Topical viscous budesonide suspension for treatment of eosinophilic esophagitis. J. Allergy Clin. Immunol. 2005; 116(3): 705-706.
Aceves SA. Allergy Testing in Patients with Eosinophilic Esophagitis. Gastroenterology & Hepatology, 2016; 12(8): 516-518.
Batchelor H. Bioadhesive Dosage Forms for Esophageal Drug Delivery. Pharm. Res. 2005; 22(2): 175-181.
Verhulst ML. Eosinophilic esophagitis; good response to local treatment with budesonide. Eur. J. Gastroenterol. & Hepatol. 1998; 10(12): A97.
Examination Report received in Indian Application No. 202117019240 dated Nov. 9, 2022.
Chilean Written Opinion dated Sep. 6, 2022.
Extended European Search Report on EP 19150077.6 dated Jun. 19, 2019.
Search Report issued in Chilean Application No. 202101046 dated Sep. 6, 2022.
Esposito et al., "Investigation of surface properties of some polymers by a thermodynamic and mechanical approach: possibility of predicting mucoadhesion and biocompatibility," Biomaterials, vol. 15, No. 3, pp. 177-182 (Feb. 1994).
D. Baumgart et al. "Treatment of inflammatory bowel disease: A review of medical therapy" World Journal of Gastroenterology; Jan. 21, 2008; 14(3): 354-377; ISSN 1007-9327.
Office Action dated Jun. 16, 2023, received in Chilean Patent Application No. 202101046.
Office Action dated Jun. 23, 2023, received in Colombian Patent Application No. NC2021/0005913.
P. Rawla et al. "Efficacy and Safety of Budesonide in the Treatment of Eosinophilic Esophagitis: Updated Systematic Review and Meta-Analysis of Randomized and Non-Randomized Studies" Nov. 2, 2018; Drugs in R&D; 18:259-269.
C. Ey et al. "Paediatric formulation: budesonide 0.1 mg/mL viscous oral solution for eosinophilic esophagitis using cyclodextrins" Pharm Technol Hosp Pharm, 2018, 3(2), pp. 71-77.
Communication pursuant to Rules 70(2) and 70a(2) EPC and reference to Rule 39(1) EPC dated Oct. 16, 2023 received in European Patent Application No. 23181722.2.
Extended European Search Report dated Sep. 12, 2023 received in European Patent Application No. 23181722.2.
M. Bonnet et al. "Formulation of a 3-months Stability Oral Viscous Budesonide Gel and Development of an Indicating Stability HPLC Method" Pharm Technol Hosp Pharm, 2018, 3(2), pp. 91-99.
Office Action dated Dec. 6, 2023 received in Japanese Patent Application No. 2021-521814.
Office Action dated Jul. 27, 2023 received in Mexican Patent Application No. MX/a/2021/004537.
Office Action dated Nov. 22, 2023 received Columbian Patent Application No. NC2021/0005913.
Office Action dated Sep. 11, 2023 received in Japanese Patent Application No. 2021-521814.
Office Action dated Sep. 7, 2023 received in Chinese Patent Application No. 201980084843.5.
S. Oliva et al. "A New Formulation of Oral Viscous Budesonide in Treating Paediatric Eosinophilic Oesophagitis: A Pilot Study" JPGN, 2017, 64(2), pp. 218-224.
Office Action received in Chinese Patent Application No. 201980084843.5 dated Apr. 17, 2023.
Zur et al. "Eosinophilic esophagitis: treatment with oral viscous budesonide" PMID: 23050387 Int J Pharm Compd. Oct. 31, 2012;16(4):288-293.
Office Action received in Chinese Patent Application No. 201980084843.5 dated Jan. 8, 2024.
Office Action dated Jul. 24, 2024, received in Columbian Patent Application No. NC2021/0005913.

(56) References Cited

OTHER PUBLICATIONS

Preliminary Office Action dated Jun. 25, 2024, received in Brazilian Patent Application No. 1120210071407.
Office Action dated Oct. 24, 2024, received in Korean Patent Application No. 10-2021-7011830.
Extended European Search Report dated Sep. 19, 2025, in European Application No. 25186229.8.

* cited by examiner

MUCOADHESIVE PHARMACEUTICAL COMPOSITIONS OF CORTICOSTEROIDS

CROSS-REFERENCE TO RELATED APPLICATIONS

The present application is the U.S. National Stage of International Application PCT/IB2019/059079 filed Oct. 23, 2019, and claims priority to European Patent Application No. 19150077.6, filed Jan. 2, 2019, and U.S. Provisional Application No. 62/749,878, filed Oct. 24, 2018.

FIELD

Described herein are mucoadhesive pharmaceutical compositions of corticosteroids, as well as methods of making such compositions, and therapeutic methods using them.

BACKGROUND

Eosinophilic esophagitis (EoE) is a clinicopathologic disease characterized by upper intestinal symptoms and the finding of more than 15 or 20 eosinophils in the esophageal epithelium, unresponsive to proton pump inhibitor treatment. The pathogenesis of EoE is still not clear, but a growing body of evidence has established that this condition represents a T cell-mediated immune response involving several pro-inflammatory mediators and chemo-attractants known to regulate eosinophilic accumulation in the esophagus, such as IL-4, IL-5, IL-3, eotaxin-1, eotaxin-2, and eotaxin-3.

EoE prevalence seems to be worldwide (prevalence estimated at 43/100,000 inhabitants; incidence estimated at 7.4/100,000 inhabitants) but the patient population diagnosed with eosinophilic esophagitis appears to be increasing. Food impaction and dysphagia are the most common presenting symptoms in older children and adults. EoE pathogenesis is likely to be associated with allergen sensitization in predisposed individuals. EoE has a strong familial pattern based on the growing clinical literature. Approximately 8% of pediatric patients with EoE have at least one sibling or parent with EoE as well. In addition, it has been recently reported that three adult brothers with dysphagia were found to have EoE. Taken together, EoE appears to demonstrate a strong familial pattern with a much higher prevalence in siblings.

There is no specific treatment available for EoE, but some physicians prescribe budesonide and fluticasone pumps and/or dry powder to be swallowed. Several issues exist for finding a proper treatment for EoE. For example, a lack of dosage standardization compromises treatment efficacy. Additionally, patients have a difficult time adhering to treatment (such as budesonide and fluticasone pumps and/or dry powder) due to poor product taste and stomach pain and gas resulting from air ingestion. Furthermore, budesonide and fluticasone pumps and/or dry powder can also lead to cavities and oral moniliasis.

Thus, there remains a need for oral pharmaceutical compositions of corticosteroids suitable for use in treating EoE.

Many inflammatory diseases of the intestinal wall are caused or influenced by changes in the intestinal microbiota and/or an impaired interaction between the intestinal microbiota and the intestines. Such intestinal inflammations include ulcerative colitis and Crohn's disease, currently denominated "inflammatory bowel diseases" (IBD). Ulcerative colitis is a chronic inflammatory disease of the colon of unknown etiology. In its acute stages it resembles an infectious disease, but no microorganism has been definitively established as its cause. The disease causes inflammations of the mucosa of the colon, with extension to the submucosa in severe cases. Typically, not only the colon, but also the rectum is attacked, but only rarely is the ileum involved. The ulcer formation and its extent vary with the developmental stage of the disease but can often be determined macroscopically (sigmoidoscopy and colonoscopy).

The related disease, Crohn's disease, also known as regional enteritis or colitis granulomatosa, is most frequently located in the small intestine (small bowel), especially in the ileum, but may also affect the jejunum and any part of the colon, including the rectum. In the latter case the differentiation of Crohn's disease from ulcerative colitis gives rise to great diagnostic problems. Generally, the inflammation differs from that of ulcerative colitis by progressing to layers deeper than the mucosa and affecting the epithelium to a lesser degree.

Both diseases have become increasingly frequent especially in the developed countries. In the United States, the incidence of the ulcerative colitis is 5-15 cases per 100,000 inhabitants, whereas the incidence is approximately 5 per 100,000 inhabitants in the case of Crohn's disease, the figures continue to increase. Therefore, treatment of IBD has become an important problem of modern medicine.

Thus, there remains a need for oral and rectal pharmaceutical compositions of corticosteroids suitable for use in treating IBD.

SUMMARY

Provided herein are mucoadhesive pharmaceutical compositions comprising a corticosteroid dissolved and/or suspended in a mucoadhesive system, wherein the mucoadhesive system comprises a vehicle for the corticosteroid, a rheology-modifying agent, and, optionally, an aqueous acidic buffer, wherein the composition exhibits a Work of Adhesion of 150 to 350 g/s when assessed by the in vitro texture analysis described herein in Example 2, and/or wherein the composition adheres to esophageal or rectal mucosal tissue for at least 0.5 minutes after administration, such as for from at least 0.5 minutes to up to 4, 6, 8, or 12 hours, or from at least 5 minutes to up to 4, 6, 8, or 12 hours.

In any embodiments of the compositions described herein, the corticosteroid may be selected from one or more of budesonide, fluticasone, and ciclesonide. In some embodiments, the corticosteroid is budesonide. In some embodiments, the corticosteroid is fluticasone. In some embodiments, the corticosteroid is ciclesonide.

In any embodiments of the compositions described herein, the corticosteroid may be present in an amount of from 0.01 to 1% w/w, including from 0.01 to 0.1% w/w, of the composition. The corticosteroid may be budesonide, and may be present in an amount of 0.01 to 0.1% w/w of the composition, 0.02 to 0.06% w/w of the composition, or 0.025% w/w of the composition, or 0.05% w/w of the composition.

In any embodiments of the compositions described herein, the vehicle may comprise glycerin, or may consist of glycerin, or may comprise glycerin and another component, such as propylene glycol. In any embodiments, the vehicle may be present in an amount of 40 to 70% w/w of the composition. The vehicle may be present in an amount of 50% w/w of the composition. The vehicle may comprise glycerin present in an amount of 50% w/w of the composition. In any embodiments comprising propylene glycol, the propylene glycol may be present in an amount up to 20% w/w of the composition, such as from about 0.5% to 20% w/w of the composition, or about 10% to 20% w/w of the composition, such as 0.5%, 1%, 5%, 10%, 15%, or 20% w/w of the composition. The vehicle may comprise glycerin at 50% w/w of the composition and propylene glycol at 0.5%-20% w/w of the composition, or 10-20% w/w of the composition. The vehicle may comprise glycerin at 50% w/w of the composition and propylene glycol at 0.5% w/w of the composition. The vehicle may comprise glycerin at 50% w/w of the composition and propylene glycol at 10% w/w of the composition. The vehicle may comprise glycerin at 50% w/w of the composition and propylene glycol at 15% w/w of the composition. The vehicle may comprise glycerin at 50% w/w of the composition and propylene glycol at 20% w/w of the composition.

In any embodiments of the compositions described herein, the rheology-modifying agent may be present in an amount of 0.25 to 1.5% w/w of the composition. The rheology-modifying agent may be present in an amount of 1.0% w/w of the composition.

In any embodiments of the compositions described herein, the rheology-modifying agent may comprise xanthan gum, or may consist of xanthan gum, or may comprise xanthan gum and another rheology-modifying agent. The rheology-modifying agent may comprise xanthan gum present in an amount of 0.25 to 1.5% w/w of the composition. The rheology-modifying agent may comprise xanthan gum at 1.0% w/w of the composition.

In any embodiments of the compositions described herein, the composition may further comprise an aqueous acidic buffer. In some embodiments, the aqueous acidic buffer is a citric acid buffer or an acetate buffer. In some embodiments, the aqueous acidic buffer is a pH 4.5 to 5.5 citric acid buffer. In some embodiments, the aqueous acidic buffer is a pH 5.0 citric acid buffer.

In any embodiments of any of the compositions described herein, the composition optionally may further comprise one or more additional pharmaceutically acceptable excipients.

The composition may comprise one or more preservatives, such as one or more of methyl-p-hydroxybenzoate, potassium sorbate, $C_{12}$ to $C_{15}$ alkyl benzoates, alkyl p-hydroxybenzoates, propyl and butyl p-hydroxybenzoates, aloe vera extract, ascorbic acid, benzalkonium chloride, benzoic acid, benzoic acid esters of $C_9$ to $C_{15}$ alcohols, butylated hydroxytoluene (BHT), butylated hydroxyanisole (BHA), castor oil, cetyl alcohols, chlorocresol, citric acid, cocoa butter, coconut oil, diazolidinyl urea, diisopropyl adipate, dimethyl polysiloxane, DMDM hydantoin, ethanol, fatty acids, fatty alcohols, hexadecyl alcohol, hydroxybenzoate esters, iodopropynyl butylcarbamate, isononyl iso-nonanoate, jojoba oil, lanolin oil, methylparaben, mineral oil, oleic acid, olive oil, polyethers, polyoxypropylene butyl ether, polyoxypropylene cetyl ether, silicone oils, sodium propionate, sodium benzoate, sodium bisulfite, disodium metabisulfite, sorbic acid, stearic fatty acid, vitamin E, vitamin E acetate and derivatives, esters, salts and mixtures thereof. The one or more preservatives may comprise one or more selected from a vitamin C source, a polyaminocarboxylic acid, and a sulfite. In some embodiments, the one or more preservatives comprise one or more selected from ascorbic acid, EDTA or sodium edetate, and sodium bisulfite. In any embodiments comprising a preservative, the preservative may be present in amount from about 0.01% to about 1.0% w/w of the composition, including from 0.01% to 1.0%, 0.01% to 0.5% and 0.05% to 0.25%. In certain embodiments, however, the composition is substantially free of or free of preservatives, including butylated hydroxytoluene (BHT) and butylated hydroxyanisole (BHA), i.e., the composition is self-preserved.

In any embodiments of any of the compositions described herein, the composition may additionally or alternatively further comprise one or more antioxidants, such as glutathione, quinolines, polyphenols, carotenoids, sodium metabisulphite, tocopherol succinate, propyl gallate, butylated hydroxy toluene, butyl hydroxy anisole, flavonoids, a vitamin C source, polyaminocarboxylic acids, sulfites, and derivatives thereof. The one or more antioxidants may comprise one or more selected from a vitamin C source, a polyaminocarboxylic acid, and a sulfite. In some embodiments, the one or more antioxidants comprise one or more selected from ascorbic acid, EDTA or sodium edetate, and sodium bisulfite. In any embodiments comprising an antioxidant, the antioxidant may be present in amount from about 0.01% to about 1.0% w/w of the composition, including from 0.01% to 0.5% and 0.05% to 0.25%. In some embodiments, the composition comprises a component that acts as both a preservative and antioxidant.

Additionally, or alternatively, the composition may comprise one or more flavoring agents, such as one or more of berry flavor, tutti-frutti flavor, caramel flavor, root beer flavor, cream flavor, chocolate flavor, peppermint flavor, spearmint flavor, butterscotch flavor, and wintergreen flavor.

In any embodiments of any of the compositions described herein, the composition may further comprise a sweetener. The sweetener may comprise sucralose or may consist of sucralose. In any embodiments comprising sucralose, the sucralose may be present in an amount from 0.001% to 0.50% w/w of the composition, including from 0.005% to 0.1% w/w of the composition. from 0.05 to 0.50% w/w of the composition, and from 0.01% to 0.05% w/w of the composition. For example, sucralose may be present in an amount of 0.005%, 0.01%, 0.05%, or 0.10% w/w of the composition, including 0.05% w/w.

In any of the embodiments of the compositions described herein, the composition may exhibit a substantially similar work of adhesion over a temperature ranging from 20–40° C.

In any of the embodiments of the compositions described herein, the composition may be flowable at room temperature. In some embodiments, the composition has a viscosity of about 3000-9000 cps at room temperature.

In any embodiments of any of the compositions described herein, the composition may include (a) budesonide in an amount from 0.02 to 0.06% w/w of the composition, (b) glycerin in an amount from 40 to 70% w/w of the composition, (c) xanthan gum in an amount from 0.25 to 1.5% w/w of the composition, (d) an aqueous citric acid buffer at pH 4.5 to 5.5, (e) optionally, sucralose in an amount from 0.001 to 0.5% w/w of the composition, and (f) optionally, propylene glycol in an amount up to 20% w/w of the composition (e.g., from 0.5% w/w to 20% w/w, or from 10% w/w to 20% w/w). In some embodiments, the composition includes sucralose in an amount from 0.05 to 0.5% w/w of the composition.

In any embodiments of any of the compositions described herein, the composition may include (a) budesonide in an amount of about 0.05% w/w of the composition, (b) glycerin in an amount of about 50% w/w of the composition, and (c) xanthan gum in an amount of about 1% w/w of the composition.

In any embodiments of any of the compositions described herein, the composition may be a suspension or a solution.

In any embodiments of any of the compositions described herein, the composition may adhere to mucosal tissue. In any embodiments of any of the compositions described herein, the composition may adhere to the esophageal mucosal tissue. In some embodiments, at least a therapeutically effective amount of the composition adheres to the esophageal mucosal tissue for at least 0.5 minutes, at least 5 minutes, at least 10 minutes, at least 15 minutes, at least 30 minutes, or for at least 45 minutes, or for at least 60 minutes. In any embodiments of any of the compositions described herein, the composition may adhere to rectal mucosal tissue. In some embodiments, at least a therapeutically effective amount the composition adheres to rectal mucosal tissue for at least 0.5 minutes, at least 5 minutes, at least 10 minutes, at least 15 minutes, at least 30 minutes, or for at least 45 minutes, or for at least 60 minutes, as for up to 4, 6, 8, or 12 hours.

In any embodiments of any of the compositions described herein, the composition may exhibit a Work of Adhesion of from 150 to 350 g/s, or from 150 to 300 g/s, when assessed by the in vitro texture analysis described herein in Example 2.

In any embodiments of any of the compositions described herein, the composition may be formulated for oral administration. In any embodiments of any of the compositions described herein, the composition may be formulated for rectal administration.

In any embodiments, the composition may be provided in a unit dose package containing from 1 to 10 mL of the composition. In some embodiments, the composition is provided in a unit dose package containing from 2 to 5 mL of the composition.

In any embodiments, the composition may be provided in a multiple dose package. In some embodiments, the multiple dose package contains doses for 1 week of treatment, 2 weeks of treatment, 3 weeks of treatment, 4 weeks of treatment, 1 month of treatment, 2 months of treatment, or 3 months of treatment.

Also provided are methods of treating an inflammatory condition of the esophagus, such as eosinophilic esophagitis, comprising orally administering a mucoadhesive pharmaceutical composition as described herein.

Also provided are methods of treating IBD, comprising orally or rectally administering a mucoadhesive pharmaceutical composition as described herein.

In any embodiments, the composition may be administered to provide a dose of from 1 mg to 2 mg corticosteroid is per day. In some embodiments, the dose is effective for treating an inflammatory condition of the esophagus, such as eosinophilic esophagitis. In some embodiments, the dose is effective for treating an inflammatory bowel disease.

Also provided are uses of a corticosteroid in the manufacture of a medicament for treating an inflammatory condition of the esophagus, such as eosinophilic esophagitis, wherein the medicament comprises a mucoadhesive pharmaceutical composition as described herein.

Also provided are uses of a corticosteroid in the manufacture of a medicament for treating IBD, wherein the medicament comprises a mucoadhesive pharmaceutical composition as described herein.

Also provided are methods of preparing a mucoadhesive pharmaceutical composition as described herein, comprising preparing a solution or suspension comprising the corticosteroid, vehicle, rheology-modifying agent, and, optionally, aqueous acidic buffer.

DETAILED DESCRIPTION

Figure 1:
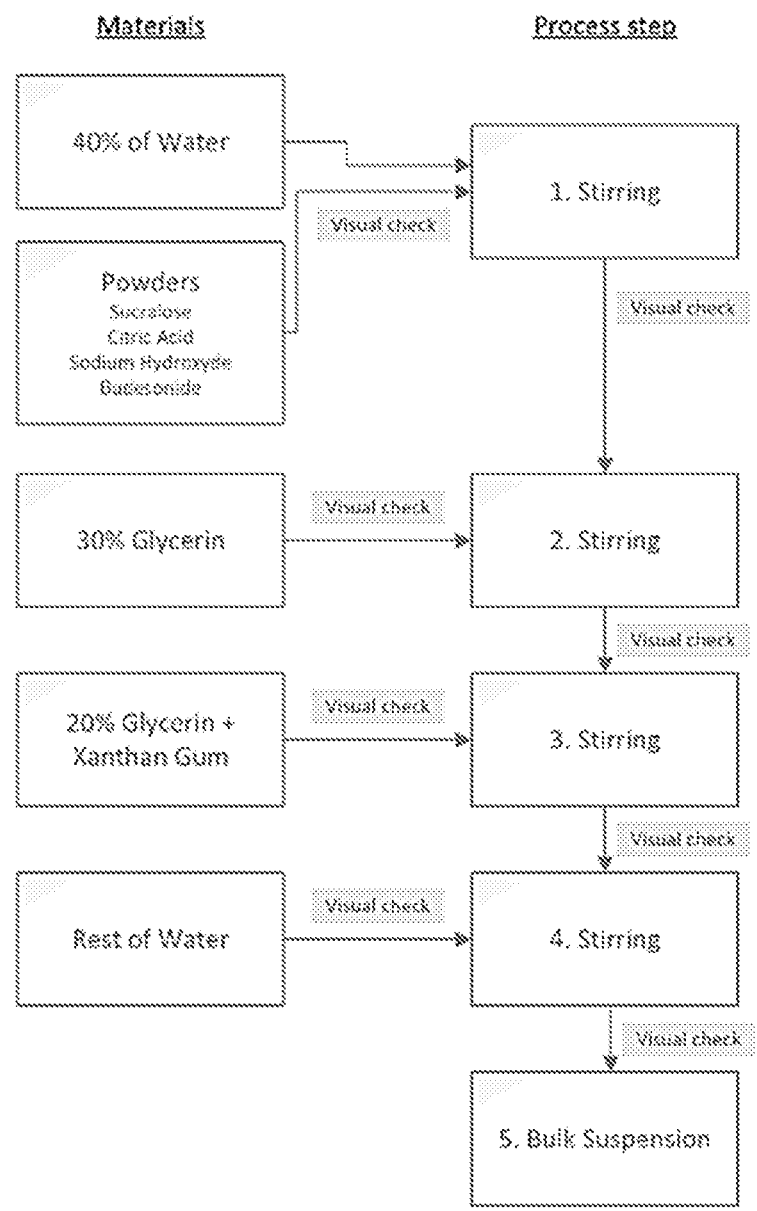
FIG. 1 is a schematic of an exemplary manufacturing processes used to prepare a composition described herein.

Described herein are mucoadhesive pharmaceutical compositions comprising a corticosteroid, methods of making such mucoadhesive pharmaceutical compositions, and therapeutic methods using them.

The compositions provide local delivery of corticosteroid to mucosal tissue, such as esophageal or rectal mucosal tissue. The compositions adhere to mucosal surfaces, such as mucosal surfaces of the esophageal or rectal mucosal tissue, and so may provide prolonged delivery of corticosteroid to the esophagus or rectum. These compositions may offer particular advantages in the context of treating EoE or IBD, by providing local and prolonged delivery of corticosteroid to the site of pathology.

Definitions

Technical and scientific terms used herein have the meanings commonly understood by one of ordinary skill in the art of pharmaceutical compositions to which the present disclosure pertains, unless otherwise defined. Reference is made herein to various methodologies known to those of ordinary skill in the art. Suitable materials and/or methods known to those of ordinary skill in the art can be utilized in carrying out the present disclosure. However, specific materials and methods are described. Materials, reagents and the like to which reference is made in the following description and examples are obtainable from commercial sources, unless otherwise noted.

As used herein, the singular forms "a," "an," and "the" designate both the singular and the plural, unless expressly stated to designate the singular only.

As used herein, the term "about" means that the number or range is not limited to the exact number or range set forth, but encompass values around the recited number or range as will be understood by persons of ordinary skill in the art depending on the context in which the number or range is used. Unless otherwise apparent from the context or convention in the art, "about" means up to plus or minus 10% of the particular term.

As used herein, "subject" denotes any mammal, including humans. For example, a subject may be suffering from or at risk of developing a condition that can be diagnosed, treated or prevented with a corticosteroid, or may be taking a corticosteroid for other purposes.

The terms "administer," "administration," or "administering" as used herein refer to (1) providing, giving, dosing and/or prescribing, such as by either a health professional or his or her authorized agent or under his direction, and (2) putting into, taking or consuming, such as by a health professional or the subject.

As used here, "self-preserved" or "self-preserving" means a composition that has sufficient antimicrobial activity to be pharmaceutically acceptable, without an additional antimicrobial agent, antioxidant, or preservative being added. For example, a self-preserved composition may satisfy the preservation efficacy requirements of the United States Pharmacopeia ("USP") (such as USP 41, paragraph <51>) and analogous guidelines in other countries, without an additional antimicrobial agent, antioxidant, or preservative being added.

As used herein, "substantially free of" means that the composition is made without the excluded component, although insignificant or trace amounts may be present as an impurity or by-product.

The terms "treat", "treating" or "treatment", as used herein, include alleviating, abating or ameliorating a disease or condition or one or more symptoms thereof, whether or not the disease or condition is considered to be "cured" or "healed" and whether or not all symptoms are resolved. The terms also include reducing or preventing progression of a disease or condition or one or more symptoms thereof, impeding or preventing an underlying mechanism of a disease or condition or one or more symptoms thereof, and achieving any therapeutic and/or prophylactic benefit.

As used herein, the phrase "therapeutically effective amount" refers to a dose that provides the specific pharmacological effect for which the drug is administered in a subject in need of such treatment. It is emphasized that a therapeutically effective amount will not always be effective in treating the conditions described herein, even though such dose is deemed to be a therapeutically effective amount by those of skill in the art. For convenience only, exemplary doses and therapeutically effective amounts are provided below with reference to human subjects. Those skilled in the art can adjust such amounts in accordance with standard practices as needed to treat a specific subject and/or condition/disease.

Compositions

As noted above, the compositions described herein typically include a corticosteroid in a mucoadhesive system, such as a corticosteroid dissolved and/or suspended in a mucoadhesive system.

Corticosteroids

The mucoadhesive pharmaceutical compositions described herein may comprise any one or more pharmaceutically acceptable corticosteroids, such as any one or more corticosteroids pharmaceutically acceptable for oral administration or for rectal administration, such as topically active steroids.

Non-limiting examples of suitable corticosteroids include one or more selected from budesonide, fluticasone, ciclesonide, cortisone, hydrocortisone, methylprednisolone, prednisolone, prednisone, triamcinolone, amcinonide, desonide, fluocinolone acetonide, fluocinonide, halcinonide, triamcinolone acetonide, beclometasone, betamethasone, dexamethasone, fluocortolone, halometasone, mometasone, flunisolide, ciclesonide, and fludrocortisone, and pharmaceutically acceptable salts and esters of each thereof.

Pharmaceutically acceptable salts and esters of corticosteroids are known in the art. Exemplary pharmaceutically acceptable salts include acid addition salts, such as hydrochloride salts. Any pharmaceutically acceptable salt can be used, such as sodium and calcium salts. Other non-limiting exemplary salts include salts formed with a carboxylic acid group, alkali metal salts, and alkaline earth metal salts. Non-limiting examples of pharmaceutically acceptable esters include straight chain or branched $C_1$-$C_{18}$ alkyl esters, including methyl, ethyl, propyl, isopropyl, butyl, isobutyl, amyl, hexyl, heptyl, octyl, nonyl, decyl, lauryl, myristyl, cetyl, and stearyl, and the like; straight chain or branched $C_2$-$C_{18}$ alkenyl esters, including vinyl, allyl, undecenyl, oleyl, linolenyl, and the like; $C_3$-$C_8$ cycloalkyl esters, including cyclopropyl, cyclobutyl, cyclopentyl, cyclohexyl, cycloheptyl and cyclooctyl, and the like; aryl esters, including phenyl, toluoyl, xylyl, naphthyl, and the like; alicyclic esters, including menthyl and the like; or aralkyl esters, including benzyl, phenethyl, and the like.

In some embodiments, a composition as described herein comprises budesonide. Budesonide has the molecular formula $C_{25}H_{34}O_6$, a molecular weight of 430.53, and the chemical name 16,17-butylidenebis(oxy)-11,21-dihydroxy-, (11β, 16α)-pregna-1,4-diene-3,20-dione. It is registered under CAS Registry Number 51333-22-3 and Einecs 257-139-7.

In some embodiments, a composition as described herein comprises fluticasone. Fluticasone has the molecular formula $C_{22}H_{27}F_3O_4S$, a molecular weight of 444.51, and the chemical name 6α,9α-difluoro-11β,17α-dihydroxy-16α-methyl-21-thia-21-fluoromethylpregna-1,4-dien-3,20-dione. Fluticasone is registered under CAS Registry Number 90566-53-3.

In some embodiments, a composition as described herein comprises ciclesonide. Ciclesonide has the molecular formula $C_{32}H_{44}O_7$, a molecular weight of 540.69 g/mol, and the chemical name (11β, 16α)-16, 17-[[(R)-cyclohexylmethylene]bis(oxy)]-11-hydroxy-21-(2-methyl-1-oxopropoxy)-pregna-1, 4-diene-3, 20-dione. Ciclesonide is registered under CAS Registry Number 126544-47-6.

The mucoadhesive pharmaceutical compositions described herein may include a therapeutically effective amount of corticosteroid. The therapeutically effective amount may depend on the specific corticosteroid being used, the condition being treated, the route of administration, the subject being treated, the desired effect, and the intended duration of therapeutic effect of the compositions. Compositions comprising more than one corticosteroid may include a therapeutically effective amount of each corticosteroid, or an amount of one or more of the corticosteroids that is not therapeutically effective on its own, but the amount of all corticosteroids present is therapeutically effective.

In any embodiments, the corticosteroid may be present in an amount of from about 0.001% to about 10% w/w of the composition, such as about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, or about 10% w/w of the composition. The corticosteroid may be present in an amount of from about 0.01% to about 0.5%, or about 1.0%, or about 1.5%, or about 2.0%, or about 2.5% or about 3.0%, or about 3.5%, or about 4.0%, or about 4.5%, or about 5.0%, or about 6.0%, or about 7.0%, or about 8.0%, or about 9.0%, or about 10% w/w of the composition. The corticosteroid may be present in an amount of from about 0.01% to about 0.03%, or about 0.04%, or about 0.05%, or about 0.06%, or about 0.07%, or about 0.08%, or about 0.09%, or about 0.1%, or about 0.2%, or about 0.3%, or about 0.4%, w/w of the composition. The corticosteroid may be present in an amount of from about 0.01 to about 1% w/w of the composition. The corticosteroid may be present in an amount of from about 0.01 to about 0.1% w/w of the composition. The corticosteroid may be present in an amount of about 0.025% w/w of the composition. The corticosteroid may be present in an amount of about 0.05% w/w of the composition.

In any embodiments of compositions comprising more than one corticosteroid, the amount of each may be selected independently of the other. In some such embodiments, the composition may include one of the foregoing amounts of each corticosteroid. In other embodiments of compositions comprising more than one corticosteroid, the amount of each is selected to complement the other. In any such embodiments, the compositions may have a total corticosteroid content corresponding to one of the foregoing amounts. Embodiments of compositions comprising more than one or more than two corticosteroids also are contemplated.

In embodiments where the corticosteroid comprises budesonide, the budesonide may be present in an amount of from about 0.001% to about 10% w/w of the composition, or from about 0.01% to about 0.5%, or about 1.0%, or about 1.5%, or about 2.0% w/w of the composition. The budesonide may be present in amount of from about 0.01% to about 0.03%, or about 0.04%, or about 0.05%, or about 0.06%, or about 0.07%, or about 0.08%, or about 0.09%, or about 0.1% w/w of the composition. The budesonide may be present in an amount of from about 0.001% to about 10% w/w of the composition, such as about 0.001%, about 0.002%, about 0.003%, about 0.004%, about 0.005%, about 0.006%, about 0.007%, about 0.008%, about 0.009%, as about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, or about 10% w/w of the composition. The budesonide may be present in an amount of from about 0.01 to 1.0% w/w of the composition. The budesonide may be present in an amount of from about 0.01 to 0.1% w/w of the composition. The budesonide may be present in an amount of about 0.025% w/w of the composition. The budesonide may be present in an amount of about 0.05% w/w of the composition.

In some embodiments, the corticosteroid comprises fluticasone. In some embodiments, the fluticasone is present in an amount of from about 0.001% to about 10% w/w of the composition, or from about 0.01% to about 0.5%, or about 1.0%, or about 1.5%, or about 2.0% w/w of the composition. The fluticasone may be present in amount of from about 0.01% to about 0.03%, or about 0.04%, or about 0.05%, or about 0.06%, or about 0.07%, or about 0.08%, or about 0.09%, or about 0.1% w/w of the composition. The fluticasone may be present in an amount of from about 0.001% to about 10% w/w of the composition, such as about 0.001%, about 0.002%, about 0.003%, about 0.004%, about 0.005%, about 0.006%, about 0.007%, about 0.008%, about 0.009%, as about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, or about 10% w/w of the composition. The fluticasone may be present in an amount of from about 0.01 to 1.0% w/w of the composition. The fluticasone may be present in an amount of from about 0.01 to 0.1% w/w of the composition.

In some embodiments, the corticosteroid comprises ciclesonide. In some embodiments, the ciclesonide is present in an amount of from about 0.001% to about 10% w/w of the composition, or from about 0.01% to about 0.5%, or about 1.0%, or about 1.5%, or about 2.0% w/w of the composition. The ciclesonide may be present in amount of from about 0.01% to about 0.03%, or about 0.04%, or about 0.05%, or about 0.06%, or about 0.07%, or about 0.08%, or about 0.09%, or about 0.1% w/w of the composition. The ciclesonide may be present in an amount of from about 0.001% to about 10% w/w of the composition, such as about 0.001%, about 0.002%, about 0.003%, about 0.004%, about 0.005%, about 0.006%, about 0.007%, about 0.008%, about 0.009%, as about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, or about 10% w/w of the composition. The ciclesonide may be present in an amount of from about 0.01 to 1.0% w/w of the composition. The ciclesonide may be present in an amount of from about 0.01 to 0.1% w/w of the composition.

In any embodiments, the corticosteroid may be present at a concentration of from about 0.1 mg/ml to about 1.0 mg/ml, such as about 0.1 mg/ml, about 0.2 mg/ml, about 0.3 mg/ml, about 0.4 mg/ml, about 0.5 mg/ml, about 0.6 mg/ml, about 0.7 mg/ml, about 0.8 mg/ml, about 0.9 mg/ml, or about 1.0 mg/ml. The corticosteroid may be present at a concentration of from about 0.1 to about 0.2 mg/ml, or about 0.3 mg/ml, or about 0.4 mg/ml, or about 0.5 mg/ml, or about 0.6 mg/ml, or about 0.7 mg/ml, or about 0.8 mg/ml, or about 0.9 mg/ml. The corticosteroid may be present at a concentration of from about 0.2 mg/ml to about 0.8 mg/ml; or from about 0.3 mg/ml to about 0.7 mg/ml; or from about 0.4 mg/ml to about 0.5 mg/ml. The corticosteroid may be present at a concentration of about 0.5 mg/ml.

In embodiments comprising more than one corticosteroid, the amount of each may be selected independently of the other. In any such embodiments, the composition may include one of the foregoing concentrations of each corticosteroid. In other embodiments of compositions comprising more than one corticosteroid, the amount of each is selected to complement the other. In any such embodiments, the compositions may have a total corticosteroid concentration corresponding to one of the foregoing concentrations. Other embodiments of compositions comprising more than one, or more than two, corticosteroids also are contemplated.

In any embodiments where the corticosteroid comprises budesonide, the budesonide may be present at a concentration of from about 0.1 mg/ml to about 1.0 mg/ml, such as about 0.1 mg/ml, about 0.2 mg/ml, about 0.3 mg/ml, about 0.4 mg/ml, about 0.5 mg/ml, about 0.6 mg/ml, about 0.7 mg/ml, about 0.8 mg/ml, about 0.9 mg/ml, or about 1.0 mg/ml. The budesonide may be present at a concentration of from about 0.1 to about 0.2 mg/ml, or about 0.3 mg/ml, or about 0.4 mg/ml, or about 0.5 mg/ml, or about 0.6 mg/ml, or about 0.7 mg/ml, or about 0.8 mg/ml, or about 0.9 mg/ml. The budesonide may be present at a concentration of from about 0.2 mg/ml to about 0.8 mg/ml; or from about 0.3 mg/ml to about 0.7 mg/ml; or from about 0.4 mg/ml to about 0.5 mg/ml. The budesonide may be present at a concentration of about 0.5 mg/ml.

In embodiments where the corticosteroid comprises fluticasone, the fluticasone may be present at a concentration of from about 0.1 mg/ml to about 1.0 mg/ml, such as about 0.1 mg/ml, about 0.2 mg/ml, about 0.3 mg/ml, about 0.4 mg/ml, about 0.5 mg/ml, about 0.6 mg/ml, about 0.7 mg/ml, about 0.8 mg/ml, about 0.9 mg/ml, or about 1.0 mg/ml. The fluticasone may be present at a concentration of from about 0.1 to about 0.2 mg/ml, or about 0.3 mg/ml, or about 0.4 mg/ml, or about 0.5 mg/ml, or about 0.6 mg/ml, or about 0.7 mg/ml, or about 0.8 mg/ml, or about 0.9 mg/ml. The fluticasone may be present at a concentration of from about 0.2 mg/ml to about 0.8 mg/ml; or from about 0.3 mg/ml to about 0.7 mg/ml; or from about 0.4 mg/ml to about 0.5 mg/ml. The fluticasone may be present at a concentration of about 0.5 mg/ml.

In any embodiments wherein the corticosteroid comprises ciclesonide, the ciclesonide may be present at a concentration of from about 0.1 mg/ml to about 1.0 mg/ml, such as about 0.1 mg/ml, about 0.2 mg/ml, about 0.3 mg/ml, about 0.4 mg/ml, about 0.5 mg/ml, about 0.6 mg/ml, about 0.7 mg/ml, about 0.8 mg/ml, about 0.9 mg/ml, or about 1.0 mg/ml. The ciclesonide may be present at a concentration of from about 0.1 to about 0.2 mg/ml, or about 0.3 mg/ml, or about 0.4 mg/ml, or about 0.5 mg/ml, or about 0.6 mg/ml, or about 0.7 mg/ml, or about 0.8 mg/ml, or about 0.9 mg/ml. The ciclesonide may be present at a concentration of from about 0.2 mg/ml to about 0.8 mg/ml; or from about 0.3 mg/ml to about 0.7 mg/ml; or from about 0.4 mg/ml to about 0.5 mg/ml. The ciclesonide may be present at a concentration of about 0.5 mg/ml.

Mucoadhesive System

As noted above, the compositions described herein include a mucoadhesive system capable of adhering to mucosal surfaces, such as esophageal or rectal mucosal tissue.

The mucoadhesive systems typically comprise or consist of a rheology-modifying agent, a vehicle for the corticosteroid, and, optionally, an aqueous acidic buffer.

Non-limiting examples of rheology-modifying agents suitable for use in the compositions described herein include xanthan gum, arabic gum, shiraz gum, karaya gum, guar gum, gellan gum, and alginates (e.g., sodium alginate). Other non-limiting examples include carbomers, carboxyethylene polymers, and/or polyacrylic acids (such as Carbopol 980 or 940 NF, 981 or 941 NF, 1382 or 1342 NF, 5984 or 934 NF, ETD 2020, 2050, 934P NF, 971P NF, 974P NF, Noveon AA-1 USP); poly(2-hydroxyethyl methacrylate) (PHEMA), poly(methacrylic acid), polyethylene oxides, poloxamers, cellulose derivatives such as hydroxypropylmethylcellulose (HPMC), ethylhydroxyethylcellulose (EHEC), carboxymethylcellulose (CMC), salts of carboxymethylcellulose, hydroxypropylcellulose (HPC), hydroxyethylcellulose (HEC), hydroxyethylmethylcellulose, polyvinylpyrrolidones, chitosans (e.g., chitosan and thiolated chitosan), pectin, gelatin, polyvinyl alcohols, and veegum.

In any embodiments of the compositions described herein, the rheology-modifying agent may comprise xanthan gum, or may consist of xanthan gum, or may comprise xanthan gum and another rheology-modifying agent such as one or more described herein or known in the art.

In any embodiments of the compositions described herein, the rheology-modifying agent may be present in an amount of 0.01 to 10% w/w of the composition, such as about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, or about 10% w/w of the composition. The rheology-modifying agent may be present in an amount of from about 0.01% to about 5%, or about 0.05% to about 4%, or about 0.1% to about 3%, or about 0.2% to about 2%, or about 0.25% to about 1.5%, or about 0.3% to about 1.2%, or about 0.5% to about 1.0% w/w of the composition. The rheology-modifying agent may be present in an amount of from about 0.25% to about 1.5% w/w of the composition. The rheology-modifying agent may be present in an amount of 1.0% w/w of the composition. The rheology-modifying agent may be present in an amount up to about 3%, or up to about 1.5%, or up to about 0.25%, or up to about 0.1% w/w of the composition.

In some embodiments, the rheology-modifying agent comprises xanthan gum which is present in an amount of 0.25 to 1.5 w/w of the composition. The rheology-modifying agent may comprise xanthan gum at 1.0% w/w of the composition.

Vehicle

As noted above, the compositions described herein also include a vehicle for the corticosteroid. As used herein, "vehicle" refers to a pharmaceutically acceptable vehicle suitable for the intended route of administration (e.g., oral or rectal) in which the corticosteroid may be partially or fully dissolved or suspended, wherein the vehicle components do not have a direct therapeutic effect against the condition(s) for which the composition is administered (e.g., against the indicated use(s)). In some embodiments, the corticosteroid(s) is suspended in the vehicle. In some embodiments, the vehicle is a solvent for the corticosteroid(s). In some embodiments, the corticosteroid(s) is dissolved in the vehicle. In some embodiments, the corticosteroid(s) is partly suspended and partly dissolved in the vehicle.

Examples of suitable vehicle components include but are not limited to glycerin and propylene glycol. Additional examples include, but are not limited to, PECEOL™ (Glyceryl monooleate Type 40), LABRAFAC™ PG (Propylene glycol dicaprylocaprate), PLUROL® OLEIQUE CC497 (Polyglyceryl-3 dioleate), LABRAFIL® CS1944 (Oleoyl polyoxyl-6 glycerides), diethylene glycol monoethyl ether. Mixtures of any two or more of the foregoing may be used. In some embodiments, the vehicle comprises glycerin, consists of glycerin, or comprises glycerin and another vehicle, such as propylene glycol. In some embodiments, the composition does not include polypropylene glycol. In some embodiments, the composition does not include polyethylene glycol. In some embodiments, the composition does not include polypropylene glycol and does not include polyethylene glycol.

The amount of vehicle present in the composition can be selected and controlled to provide partial or full solubilization of the corticosteroid and/or other components that may be present, and achieve desired properties of the composition, such as adhesion to mucosal surfaces. Exemplary amounts are discussed in more detail below. For example, the total amount of vehicle may be from about 1 to about 90% w/w of the composition, such as about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, or about 90% w/w of the composition. The total amount of vehicle may be from about 25% to about 85%, or about 30% to about 80%, or about 35% to about 75%, or about 40% to about 70%, or about 45% to about 60% w/w of the composition. The total amount of vehicle may be about 50% w/w of the composition.

In some embodiments, the vehicle comprises glycerin. The glycerin may be present in an amount of from about 1 to about 90% w/w, about 25% to about 85%, or about 30% to about 80%, or about 35% to about 75%, or about 40% to about 70%, or about 45% to about 60% w/w of the composition. The glycerin may be present in an amount of about 30% to about 80% w/w of the composition. The glycerin may be present in an amount from about 40% to about 70% w/w of the composition. The glycerin may be present in an amount from about 45% to about 60% w/w of the composition. The glycerin may be present in an amount of about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90% w/w of the composition. The glycerin may be present in an amount of about 50% w/w of the composition.

In some embodiments, the vehicle comprises propylene glycol, which also may act as a penetration enhancer. In some embodiments the propylene glycol is present in an amount of up to about 40%, or up to about 30%, or up to about 20%, or up to about 15% w/w of the composition. The propylene glycol may be present in an amount of up to about 30% w/w of the composition. The propylene glycol may be present in an amount up to about 20% w/w of the composition. The propylene glycol may be present in an amount of from about 0.5% to about 40%, from about 0.5% to about 30%, from about 0.5%, about 25%, from about 0.5% to about 20%, from about 0.5% to about 15%, or from about 0.5% to about 10% w/w of the composition. The propylene glycol may be present in an amount of about 0.5%, about 1%, about 5%, about 10%, about 15%, about 20%, about 25%, about 30%, about 35%, or about 40% w/w of the composition.

In specific embodiments comprising propylene glycol, the propylene glycol may be present in an amount up to 20% w/w of the composition, such as from about 0.5% to 20% w/w of the composition, or about 10% to 20% w/w of the composition, such as 0.5%, 1%, 5%, 10%, 15%, or 20% w/w of the composition.

In some embodiments, the composition comprises about 40 to 70% w/w glycerin and up to about 20% w/w propylene glycol, such as from about 0.5% to 20% w/w. For example, the composition may comprise about 50% w/w glycerin and about 20% w/w propylene glycol.

Depending on the type and amount of vehicle used, the compositions described herein can be obtained as a solution or suspension. Thus, in some embodiments, the composition is a suspension (e.g., the corticosteroid is at most partially dissolved in the vehicle), while in some embodiments, the composition is a solution (e.g., the corticosteroid is substantially completely dissolved in the vehicle).

pH Adjusting Agent

The mucoadhesive pharmaceutical compositions described herein typically further comprise water and, optionally, a pH adjusting agent. The pH-adjusting agent may be provided as an aqueous buffer, such as an aqueous acidic buffer.

Non-limiting examples of aqueous acidic buffer include citric acid buffers, acetate buffers, benzoate buffers, borate buffers, citrate buffers, carbonate buffers, hydrochloric acid, lactate buffers, perchloric acid, tartric acid, proprionate buffers, and mixtures thereof. In some embodiments, the aqueous acidic buffer is a citric acid buffer.

The pH of the aqueous acidic buffer can be selected and controlled to provide a final composition having a desired pH, which can be selected to promote the chemical stability of the corticosteroid.

In some embodiments, the aqueous acidic buffers may have a pH of about 1 to about 6, or about 1.5 to about 5.5, or about 2 to about 5, or about 2.5 to about 4.5, about 3 to about 4, or about 4.5 to about 5.5. In some embodiments, the aqueous acidic buffer is a citric acid buffer or an acetate buffer. In some embodiments, the aqueous acidic buffer is a citric acid buffer at pH 4.5 to 5.5. In some embodiments, the aqueous acidic buffer is a citric acid buffer at about pH 5.0, such as pH 5±0.1. In some embodiments, the aqueous acidic buffer is an acetate buffer at pH 4.7. For example, an aqueous acidic buffer at pH 4.5 to 5.5, such as an aqueous citric acid buffer, is suitable for budesonide compositions described herein.

The pH of the composition described herein can be selected and controlled to be close to physiological pH of esophagus, i.e. slightly acid to neutral, such as from about 4.5 to about 7. In some embodiments, the composition may have a pH of about 4.5, or about 5, or about 5.5, or about 6, or about 6.5, or about 7, and pH values between any of these values.

Other Components

The mucoadhesive pharmaceutical compositions described herein optionally may further comprise one or more optional pharmaceutically acceptable excipients. In any embodiments of the compositions described herein, the one or more optional pharmaceutically acceptable excipients may be any one or more described herein or known in the art, (e.g., as described in Rowe et al., HANDBOOK OF PHARMACEUTICAL EXCIPIENTS (Pharm. Press $7^{th}$ ed. 2012). In some embodiments, any optional pharmaceutically acceptable excipients present do not substantially impact the therapeutic efficacy of the composition. In some embodiments, the pharmaceutically acceptable excipients reduce the risks of diseases or conditions associated with chronic use of corticosteroids, such as moniliasis. Additionally or alternatively, in some embodiments, any optional pharmaceutically acceptable excipients present do not substantially impact the mucoadhesive properties of the composition. Optional pharmaceutically acceptable excipients, if present, can be incorporated in the compositions in any suitable amount sufficient to have the intended effect of the component without substantially interfering with the desired properties of the compositions, such as their mucoadhesive, drug delivery and therapeutic properties.

Examples of optional pharmaceutically acceptable excipients include but are not limited to preservatives, sweeteners, antioxidants, chelating agents, colorants, penetration enhancers, and/or flavoring agents. The categories of preservatives and antioxidants are not mutually exclusive, as some agents can act as both a preservative and an antioxidant.

Non-limiting examples of preservatives include methyl-p-hydroxybenzoate, potassium sorbate, $C_{12}$ to $C_{15}$ alkyl benzoates, alkyl p-hydroxybenzoates, propyl and butyl p-hydroxybenzoates, aloe vera extract, ascorbic acid, benzalkonium chloride, benzoic acid, benzoic acid esters of $C_9$ to $C_{15}$ alcohols, butylated hydroxytoluene (BHT), butylated hydroxyanisole (BHA), castor oil, cetyl alcohols, chlorocresol, citric acid, cocoa butter, coconut oil, diazolidinyl urea, diisopropyl adipate, dimethyl polysiloxane, DMDM hydantoin, ethanol, fatty acids, fatty alcohols, hexadecyl alcohol, hydroxybenzoate esters, iodopropynyl butylcarbamate, isononyl iso-nonanoate, jojoba oil, lanolin oil, methylparaben, mineral oil, oleic acid, olive oil, polyethers, polyoxypropylene butyl ether, polyoxypropylene cetyl ether, silicone oils, sodium propionate, sodium benzoate, sodium bisulfite, disodium metabisulfite, sorbic acid, stearic fatty acid, vitamin E, vitamin E acetate and derivatives, esters, salts and mixtures thereof. In some embodiments, the preservative is or includes methyl-p-hydroxybenzoate. In some embodiments, the preservative is or includes a vitamin C source, such as ascorbic acid or a derivative thereof, which includes salts. In some embodiments, the preservative is or includes a bisulfite. Non-limiting examples of sulfites include, but are not limited to, sodium bisulfite, sodium metabisulfite, potassium bisulfite, and potassium metabisulfite. In some embodiments, the preservative is or includes sodium metabisulfite. In some embodiments, the preservative is or includes a polyaminocarboxylic acid, such as edetic acid (ethylenediaminetetraacetic acid/EDTA). In some embodiments, the preservative is or includes edetic acid or a derivative thereof, such as a salt. In some embodiments, the preservative is or includes edetate disodium.

The preservative may be present in any suitable amount, including from about 0.01% to about 1.0%, about 0.01% to about 0.5%, and about 0.05% to 0.25% w/w of the composition. The preservative may be present in an amount of about 0.01%, 0.02%, 0.03%, 0.05%, 0.06%, 0.07%, 0.08%, 0.09%, 0.10%, 0.15%, 0.20%, 0.25%, 0.30%, 0.35%. 0.40%, 0.45%, 0.50%, 0.55%, 0.60%, 0.65%, 0.70%, 0.75%, 0.80%, 0.85%, 0.90%, 0.95%, or 1.0% w/w of the composition. In some embodiments, the preservative is or includes ascorbic acid or a salt thereof, and is present in an amount of from about 0.01% to about 1.0% w/w of the composition. including any amount therebetween, such as 0.01%, 0.02%, 0.03%, 0.05%, 0.06%, 0.07%, 0.08%, 0.09%, 0.10%, 0.15%, 0.20%, 0.25%, 0.30%, 0.35%. 0.40%, 0.45%, 0.50%, 0.55%, 0.60%, 0.65%, 0.70%, 0.75%, 0.80%, 0.85%, 0.90%, 0.95%, or 1.0% w/w of the composition. In some embodiments, the preservative is or includes a bisulfite, such as sodium metabisulfite, and is present in an amount of from about 0.05% to about 0.25% w/w of the composition. including any amount therebetween, such as 0.05%, 0.06%, 0.07%, 0.08%, 0.09%, 0.10%, 0.15%, 0.20%, 0.25% w/w of the composition. In some embodiments, the preservative is or includes edetic acid or a salt thereof, such as edetate disodium, and is present in an amount of from about 0.01% to about 0.5% w/w of the composition, including any amount therebetween, such as 0.01%, 0.02%, 0.03%, 0.05%, 0.06%, 0.07%, 0.08%, 0.09%, 0.10%, 0.15%, 0.20%, 0.25%, 0.30%, 0.35%. 0.40%, 0.45%, or 0.50% w/w of the composition.

Non-limiting examples of antioxidants include glutathione, quinolines, polyphenols, carotenoids, sodium metabisulphite, tocopherol succinate, propyl gallate, butylated hydroxy toluene, butyl hydroxy anisole, flavonoids, a vitamin C source, polyaminocarboxylic acids, sulfites, and derivatives thereof. Non-limiting examples of vitamin C sources for use as a preservative and/or antioxidant include ascorbic acid; ascorbyl palmitate; dipalmitate L-ascorbate; sodium L-ascorbate-2-sulfate; an ascorbic salt, such as sodium, potassium, or calcium ascorbate; and mixtures thereof. In some embodiments, the antioxidant is a vitamin C source. In some embodiments, the antioxidant is ascorbic acid or a derivative thereof, which includes salts. A non-limiting example of a polyaminocarboxylic acid is edetic acid (ethylenediaminetetraacetic acid/EDTA). In some embodiments, the antioxidant is edetic acid or a derivative thereof, such as a salt. In some embodiments, the antioxidant is edetate disodium. Non-limiting examples of sulfites include but are not limited to sodium bisulfite, sodium metabisulfite, potassium bisulfite, and potassium metabisulfite. In some embodiments, the antioxidant is a sulfite. In some embodiments, the preservative is or includes sodium metabisulfite.

The antioxidant may be present in any suitable amount, including from about 0.01% to about 1.0%, about 0.01% to about 0.5%, and about 0.05% to 0.25% w/w of the composition. The antioxidant may be present in an amount of about 0.01%, 0.02%, 0.03%, 0.05%, 0.06%, 0.07%, 0.08%, 0.09%, 0.10%, 0.15%, 0.20%, 0.25%, 0.30%, 0.35%. 0.40%, 0.45%, 0.50%, 0.55%, 0.60%, 0.65%, 0.70%, 0.75%, 0.80%, 0.85%, 0.90%, 0.95%, or 1.0% w/w of the composition. In some embodiments, the antioxidant is or includes ascorbic acid or a salt thereof, and is present in an amount of from about 0.01% to about 1.0% w/w of the composition. including any amount therebetween, such as 0.01%, 0.02%, 0.03%, 0.05%, 0.06%, 0.07%, 0.08%, 0.09%, 0.10%, 0.15%, 0.20%, 0.25%, 0.30%, 0.35%. 0.40%, 0.45%, 0.50%, 0.55%, 0.60%, 0.65%, 0.70%, 0.75%, 0.80%, 0.85%, 0.90%, 0.95%, or 1.0% w/w of the composition. In some embodiments, the antioxidant is or includes a bisulfite, such as sodium metabisulfite, and is present in an amount of from about 0.05% to about 0.25%. w/w of the composition, including any amount therebetween, such as 0.05%, 0.06%, 0.07%, 0.08%, 0.09%, 0.10%, 0.15%, 0.20%, 0.25% of the composition. In some embodiments, the antioxidant is or includes edetic acid or a salt thereof, such as edetate disodium, and is present in an amount of from about 0.01% to about 0.5% w/w of the composition, including any amount therebetween, such as 0.01%, 0.02%, 0.03%, 0.05%, 0.06%, 0.07%, 0.08%, 0.09%, 0.10%, 0.15%, 0.20%, 0.25%, 0.30%, 0.35%. 0.40%, 0.45%, or 0.50% w/w of the composition.

As noted above, some preservative agents are antioxidants, and vice versa. Examples of preservatives that also acts as an antioxidant include the sulfites, polyaminocarboxylic acids, and vitamin C sources discussed above. These agents may be present in any suitable amount, including the amounts illustrated above.

In certain embodiments (for example, when the composition is self-preserving), the compositions are substantially free of or free of preservatives, antioxidants, or both, such as being free of or substantially free of one or more or all of the preservatives listed above, and/or being free of or substantially free of one or more or all of the antioxidants listed above. In these embodiments, the compositions may be substantially free of or free of butylated hydroxytoluene (BHT), butylated hydroxyanisole (BHA), or both.

In some embodiments, the compositions may further comprise a penetration enhancer. In some embodiments, the penetration enhancer is or comprises propylene glycol. In some embodiments, the penetration enhancer is or comprises one or more of propylene glycol PECEOL™ (Glyceryl monooleate Type 40), LABRAFAC™ PG (Propylene glycol dicaprylocaprate), PLUROL® OLEIQUE CC497 (Polyglyceryl-3 dioleate), LABRAFIL® CS1944 (Oleoyl polyoxyl-6 glycerides), and diethylene glycol monoethyl ether.

Non-limiting examples of sweeteners include sucralose, acesulfame potassium, sorbitol, rebaudioside A, rebaudioside B, rebaudioside C, rebaudioside D, rebaudioside E, rebaudioside F, dulcoside A, dulcoside B, rubusoside, stevia, stevioside, mogroside IV, mogroside V, sorbitol, Luo Han Guo sweetener, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrsoside A, cyclocarioside I, and other salts, aspartame, alitame, saccharin, neohesperidin dihydrochalcone, cyclamate, neotame, N—[N-[3-(3-hydroxy-4-methoxyphenyl)propyl]-L-α-aspartyl]-L-phenylalanine 1-methyl ester, N—[N-[3-(3-hydroxy-4-methoxyphenyl)-3-methylbutyl]-L-α-aspartyl]-L-phenylalanine 1-methyl ester, N—[N-[3-(3-methoxy-4-hydroxyphenyl)propyl]-L-α-aspartyl]-L-phenylalanine 1-methyl ester, and salts and combinations thereof. The sweetener may be present in any suitable amount, including from about 0.001% to about 0.5%, from about 0.005% to about 0.5%, from about 0.05% to about 0.5%, and from about 0.01% to about 0.5% w/w of the composition, such as about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, or about 0.5% w/w of the composition. In some embodiments, the sweetener is or includes sucralose. Sucralose may be present in any suitable amount, including from about 0.001% to about 0.5% w/w of the composition, or from about 0.05% to about 0.5% w/w of the composition, from about 0.005% to about 0.5%, or from about 0.01% to about 0.5% w/w of the composition. Suitable amounts of sucralose include, but are not limited to, about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, or about 0.5% w/w of the composition. For example, sucralose may be present in an amount of 0.005%, 0.01%, or 0.10% w/w of the composition.

Non-limiting examples of chelating agents include ethylenediaminetetraacetic acid (EDTA) and citric acid, hydrates thereof, salts thereof, and hydrates of the salts thereof. Examples of such chelating agents include ethylenediaminetetraacetic acid disodium salt, ethylenediaminetetraacetic acid disodium salt dihydrate, and citric acid monohydrate. Various combinations of chelating agents can be used if desired. As noted above EDTA also may be used as a preservative or antioxidant.

Non-limiting examples of colorants include commercially available pigments such as FD&C Blue #1 Aluminum Lake, FD&C Blue #2, other FD&C Blue colors, titanium dioxide, iron oxide, and/or combinations thereof.

Non-limiting examples of flavoring agents include berry flavor, tutti-frutti flavor, caramel flavor, root beer flavor, cream flavor, chocolate flavor, peppermint flavor, spearmint flavor, butterscotch flavor, and wintergreen flavor and combinations thereof. Suitable berry flavoring agents include black cherry, strawberry, cherry, blueberry, raspberry and the like. In some embodiments, the composition comprises a raspberry, tutti-frutti or caramel flavor.

The identities and amounts of the excipients can be selected and adjusted to achieve the desired effect while retaining the desired properties of the composition as a whole. In some embodiments, the composition includes about 0.01% to about 10%, or about 0.03% to about 9%, or about 0.05% to about 7%, or about 0.01% to about 3%, or about 0.02% to about 2.5%, or about 0.03% to about 2.5%, or about 0.05% to about 2.5%, or about 0.1% to about 2%, or about 0.1% to about 1.5%, or about 1% to about 1.5% w/w of excipients. The composition may include about 0.01% to about 10% w/w of excipients, such as about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, or about 10% w/w of excipients. The composition may include about 0.01% to about 5% w/w of excipients. The pharmaceutical may comprise about 0.01% to about 1% w/w of excipients.

The mucoadhesive pharmaceutical compositions described herein may be formulated for oral or rectal administration. For example, the composition may be formulated for oral administration by formulating in doses and amounts suitable for oral administration with excipients suitable for oral administration, or may be formulated for rectal administration by formulating in doses and amounts suitable for rectal administration with excipients suitable for rectal administration.

Also provided herein are unit dose packages of the compositions for oral or rectal administration, such as a pouch or syringe containing a unit dose of the composition. In some embodiments, a unit dose package includes from about 1 mL to about 20 mL, from about 1 mL to about 10 mL, from about 2 mL to about 5 mL, including about 1, 2, 3, 4, 5, 6, 7, 8, 9, or 10 mL and amounts between any of these values.

Also provided herein are compositions for oral or rectal administration that are configured for multiple-dose package, such as pouches or syringes each containing a dose of the composition. In some embodiments, the multiple-dose package includes from about 1 mL to about 20 mL, from about 1 mL to about 10 mL, from about 2 mL to about 5 mL, including about 1, 2, 3, 4, 5, 6, 7, 8, 9, or 10 mL and amounts between any of these values. In some embodiments, the multiple dose package contains doses for 1 week of treatment, 2 weeks of treatment, 3 weeks of treatment, 4 weeks of treatment, 1 month of treatment, 2 months of treatment, or 3 months of treatment.

Mucoadhesive Properties

In any embodiments, the mucoadhesive pharmaceutical compositions described herein exhibit a viscosity or Work of Adhesion such that they adhere to mucosal surfaces, such as the esophageal or rectal mucosal tissue.

In some embodiments, a therapeutically effective amount of the composition adheres to the esophageal or rectal mucosal for at least 0.5 minutes, including a period of time of from 5 minutes up to the time the next dose is to be administered. Thus, for twice daily dosing, a therapeutically effective amount of the composition may adhere for up to 10 hours or up to 12 hours. For thrice daily dosing, a therapeutically effective amount of the composition may adhere for up to 6 hours or up to 8 hours. For dosing four times a day, a therapeutically effective amount of the composition may adhere for up to 4 hours or up to 6 hours.

In some embodiments, a therapeutically effective amount of the composition adheres to the esophageal or rectal mucosal for at least 0.5 minutes, at least 5 minutes, at least 10 minutes, at least 15 minutes, or at least 20 minutes, or at least 25 minutes, or at least 30 minutes, or at least 35 minutes, or at least 40 minutes, or at least 45 minutes, or at least 50 minutes, or at least 55 minutes, or at least 60 minutes, or at least 65 minutes, or at least 75 minutes, or at least 75 minutes, after administration. In some embodiments, the composition adheres to the esophageal or rectal mucosal tissue for at least 30 minutes after administration. In some embodiments, the composition adheres to the esophageal or rectal mucosal tissue for at least 45 minutes after administration. In some embodiments, the composition adheres to the esophageal or rectal mucosal tissue for at least 60 minutes after administration. In some embodiments, the composition adheres to the esophageal or rectal mucosal tissue for at least 75 minutes after administration.

In some embodiments, a therapeutically effective amount of the composition adheres to the esophageal or rectal mucosal for about 0.5 minutes to about 75 minutes, including about 0.5 minutes, about 5 minutes, about 10 minutes, about 15 minutes, about 20 minutes, about 25 minutes, about 30 minutes, about 35 minutes, about 40 minutes, about 45 minutes, about 50 minutes, about 55 minutes, about 60 minutes, about 65 minutes, and about 75 minutes, after administration. In some embodiments, the composition adheres to the esophageal or rectal mucosal tissue for about 30 minutes after administration. In some embodiments, the composition adheres to the esophageal or rectal mucosal tissue for about 45 minutes after administration. In some embodiments, the composition adheres to the esophageal or rectal mucosal tissue for about 60 minutes after administration. In some embodiments, the composition adheres to the esophageal or rectal mucosal tissue for about 75 minutes after administration.

In some embodiments, a therapeutically effective amount of the composition adheres to the esophageal or rectal mucosal for from 0.5 minutes to 12 hours, from 0.5 minutes to 8 hours, from 0.5 minutes to 6 hours, or from 0.5 minutes to 4 hours. In some embodiments, a therapeutically effective amount of the composition adheres to the esophageal or rectal mucosal for 0.5 minutes, 5 minutes, 30 minutes, 45 minutes, 1 hour, 2 hours, 3 hours, 4 hours, 5 hours, 6 hours, 7 hours, 8 hours, 9 hours, 10 hours, 11 hours, or about 12 hours. In some embodiments, a therapeutically effective amount of the composition adheres to the esophageal or rectal mucosal for from 5 minutes to 12 hours, from 5 minutes to 8 hours, from 5 minutes to 6 hours, or from 5 minutes to 4 hours. In some embodiments, a therapeutically effective amount of the composition adheres to the esophageal or rectal mucosal for from 30 minutes to 12 hours, from 30 minutes to 8 hours, from 30 minutes to 6 hours, or from 30 minutes to 4 hours. In some embodiments, a therapeutically effective amount of the composition adheres to the esophageal or rectal mucosal for from 45 minutes to 12 hours, from 45 minutes to 8 hours, from 45 minutes to 6 hours, or from 45 minutes to 4 hours. In some embodiments, a therapeutically effective amount of the composition adheres to the esophageal or rectal mucosal for from 1 to 12 hours, 1 to 8 hours, from 1 to 6 hours, or from 1 to 4 hours.

As used herein, the term "Work of Adhesion" refers to the work (force) needed to dislodge the composition from a surface. Work of Adhesion measures the adhesive capability of a composition, which may need to withstand forces that would dislodge it from the intended site of action (e.g., forces like saliva, food, liquid, and muscle contractions). Work of Adhesion can be assessed by methodologies known in the art, as illustrated in the examples. For example, Work of Adhesion can be assessed using the Texture Analyzer TA-TX2 (Stable Micro Systems, United Kingdom) at room temperature, applying 1 mL of composition to a TUFFRYN® HT-450 Filter 0.45 μm (hydrophilic polysulfone) test membrane (Pall Corp.), and recording the force needed to detach the composition as a function of elongation.

In some embodiments, the mucoadhesive pharmaceutical compositions described herein exhibit a Work of Adhesion of from about 150 to about 350 g/s, or from 150 to 350 g/s, when assessed as set forth in Example 2.

Figure 6A:
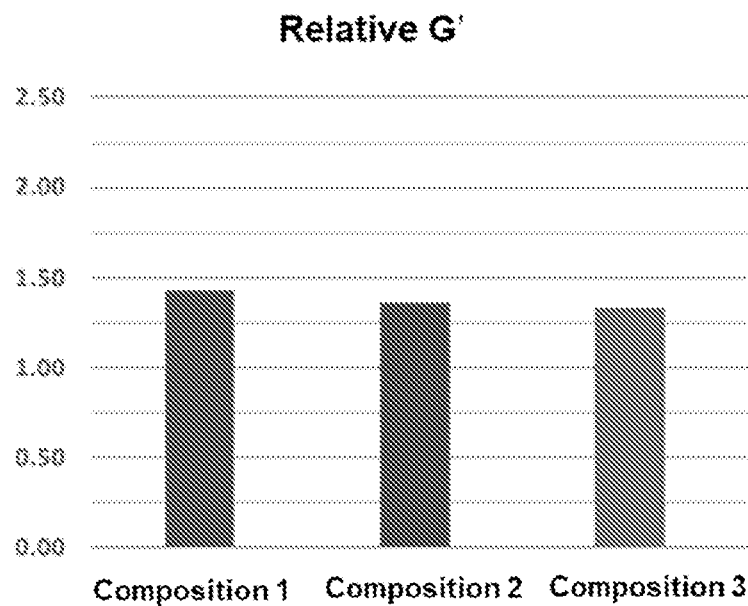
FIG. 6A shows the relative rheological synergism of compositions as described herein with mucin at 22° C.
Figure 6B:
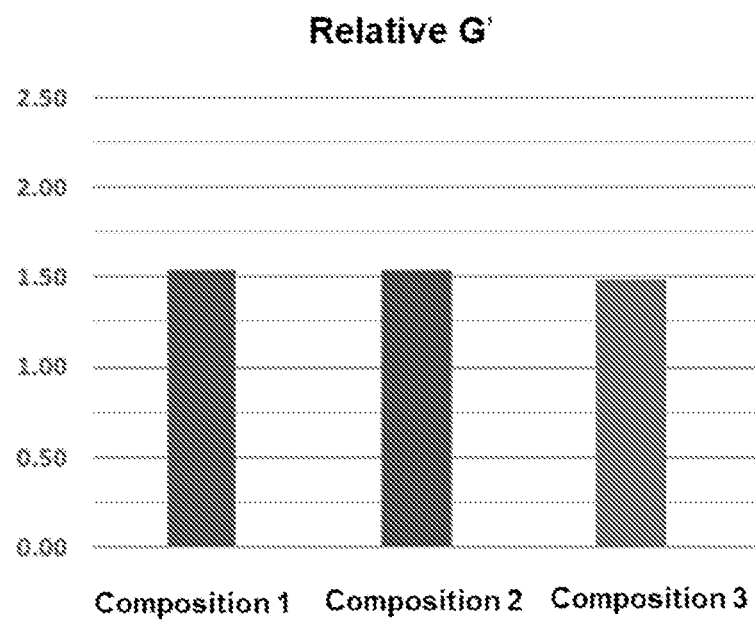
FIG. 6B shows the relative rheological synergism of compositions as described herein with mucin at 37° C.

In some embodiments, the viscosity and/or mucoadhesive properties of the compositions are substantially consistent over a biologically-relevant temperature ranging from 20–40° C. or 30-40° C., such as illustrated in FIGS. 6A and 6B. Consistency of these properties over these temperature ranges further distinguishes these embodiments from thermosensitive (e.g., thermoreversible) gels.

While not wanting to be bound by theory, it is believed that these mucoadhesive properties enhance the therapeutic effect of the compositions, such as by providing improved and/or prolonged contact between the corticosteroid-composition and target treatment site, such as esophageal tissue or rectal mucosal tissue, for improved drug delivery and/or prolonged effect.

In some embodiments, the compositions having the mucoadhesive properties described herein also have a flowable viscosity at room temperature and/or body temperature. In certain of these embodiments, the viscosity is about 1,000 to 10,000 cps at room temperature and/or body temperature, such as 3000-9000 cps or 5000-7000 cps at room temperature and/or body temperature.

With regard to specific embodiments, it was surprisingly found that compositions comprising a corticosteroid in a mucoadhesive system comprising xanthan gum, glycerin and water (optionally with an acid buffer, such as a citric acid buffer) exhibit an unexpected combination of desirable properties including exhibiting surprisingly good mucoadhesion and also being self-preserving.

The mucoadhesive pharmaceutical compositions described herein may exhibit good storage stability. For example, the compositions may stable for at least 1 month under accelerated stability testing conditions, or at least 1 year under room temperature and humidity storage conditions. A composition may be stable for at least 1 month when stored at 40° C. and 75% relative humidity. A composition may be stable for at least 1 year when stored at 25° C. and 60% relative humidity.

Exemplary Compositions

In some embodiments, the composition may include (a) budesonide in an amount from 0.02 to 0.06% w/w of the composition, (b) a vehicle comprising glycerin in an amount from 40 to 70% w/w of the composition, (c) a rheology-modifying agent comprising xanthan gum in an amount from 0.25 to 1.5% w/w of the composition (e.g., 0.5 to 1.5% w/w or 0.75 to 1.25% w/w), (d) optionally, an aqueous citric acid buffer at pH 4.5 to 5.5 (e.g., at pH 5±0.1), (e) optionally, sucralose in an amount from 0.05 to 0.5% w/w of the composition or from 0.01 to 0.5% w/w of the composition, and (f) optionally, propylene glycol in an amount up to 20% w/w of the composition (e.g., about 0.5% to 20% w/w, or about 10% to 20% w/w).

In some embodiments, the composition may include (a) budesonide in an amount from 0.02 to 0.06% w/w of the composition, (b) a vehicle comprising glycerin in an amount from 40 to 70% w/w of the composition, (c) a rheology-modifying agent comprising xanthan gum in an amount from 0.25 to 1.5% w/w of the composition (e.g., 0.5 to 1.5% w/w or 0.75 to 1.25% w/w), (d) optionally, an aqueous citric acid buffer at pH 4.5 to 5.5 (e.g., at pH 5±0.1), (e) optionally, sucralose in an amount from 0.001 to 0.5% w/w of the composition, and (f) optionally, propylene glycol in an amount up to 20% w/w of the composition (e.g., about 0.5% to 20% w/w, or about 10% to 20% w/w).

In some embodiments, the composition may include (a) budesonide in an amount of about 0.05% w/w of the composition, (b) glycerin in an amount of about 50% w/w of the composition, and (c) a rheology-modifying agent comprising xanthan gum in an amount of about 1% w/w of the composition.

In some embodiments, the composition may include (a) fluticasone in an amount from 0.01 to 0.1% w/w of the composition, (b) a vehicle comprising glycerin in an amount from 40 to 70% w/w of the composition, (c) a rheology-modifying agent comprising xanthan gum in an amount from 0.25 to 1.5% w/w of the composition (e.g., 0.5 to 1.5% w/w or 0.75 to 1.25% w/w), (d) optionally, an aqueous citric acid buffer at pH 4.5 to 5.5 (e.g., at pH 5±0.1), (e) optionally, sucralose in an amount from 0.05 to 0.5% w/w of the composition or from 0.01 to 0.5% w/w of the composition, and (f) optionally, propylene glycol in an amount up to 20% w/w of the composition (e.g., about 0.5% to 20% w/w, or about 10% to 20% w/w).

In some embodiments, the composition may include (a) fluticasone in an amount from 0.01 to 0.1% w/w of the composition, (b) a vehicle comprising glycerin in an amount from 40 to 70% w/w of the composition, (c) a rheology-modifying agent comprising xanthan gum in an amount from 0.25 to 1.5% w/w of the composition (e.g., 0.5 to 1.5% w/w or 0.75 to 1.25% w/w), (d) optionally, an aqueous citric acid buffer at pH 4.5 to 5.5 (e.g., at pH 5±0.1), (e) optionally, sucralose in an amount from 0.001 to 0.5% w/w of the composition, and (f) optionally, propylene glycol in an amount up to 20% w/w of the composition (e.g., about 0.5% to 20% w/w, or about 10% to 20% w/w).

In some embodiments, the composition may include (a) fluticasone in an amount of about 0.05% w/w of the composition, (b) glycerin in an amount of about 50% w/w of the composition, and (c) a rheology-modifying agent comprising xanthan gum in an amount of about 1% w/w of the composition.

In some embodiments of any of the compositions described herein, the composition may include (a) ciclesonide in an amount from 0.01 to 0.1% w/w of the composition, (b) a vehicle comprising glycerin in an amount from 40 to 70% w/w of the composition, (c) a rheology-modifying agent comprising xanthan gum in an amount from 0.25 to 1.5% w/w of the composition (e.g., 0.5 to 1.5% w/w or 0.75 to 1.25% w/w), (d) optionally, an aqueous citric acid buffer at pH 4.5 to 5.5 (e.g., at pH 5±0.1), (e) optionally, sucralose in an amount from 0.05 to 0.5% w/w of the composition or from 0.01 to 0.5% w/w of the composition, and (f) optionally, propylene glycol in an amount up to 20% w/w of the composition (e.g., about 0.5% to 20% w/w, or about 10% to 20% w/w).

In some embodiments of any of the compositions described herein, the composition may include (a) ciclesonide in an amount from 0.01 to 0.1% w/w of the composition, (b) a vehicle comprising glycerin in an amount from 40 to 70% w/w of the composition, (c) a rheology-modifying agent comprising xanthan gum in an amount from 0.25 to 1.5% w/w of the composition (e.g., 0.5 to 1.5% w/w or 0.75 to 1.25% w/w), (d) optionally, an aqueous citric acid buffer at pH 4.5 to 5.5 (e.g., at pH 5±0.1), (e) optionally, sucralose in an amount from 0.001 to 0.5% w/w of the composition, and (f) optionally, propylene glycol in an amount up to 20% w/w of the composition (e.g., about 0.5% to 20% w/w, or about 10% to 20% w/w).

In some embodiments, the composition may include (a) ciclesonide in an amount of about 0.05% w/w of the composition, (b) glycerin in an amount of about 50 w/w of the composition, and (c) a rheology-modifying agent comprising xanthan gum in an amount of about 1% w/w of the composition.

Methods of Manufacture

Also provided herein are processes for making the mucoadhesive pharmaceutical compositions described herein. In general, the compositions can be made by techniques known in the art, in view of the following guidance.

In general, the compositions are made by combining the components and blending or mixing. In any embodiments, the mixing may comprise high-shear mixing, at low speed or high speed. Mixing may also occur with a marine-type propeller or a planetary mixer.

While the components may be combined in any order, in some embodiments, the corticosteroid is blended with the vehicle components before being mixed with the rheology-modifying agent. In such embodiments, the amount and identity of vehicle used can be selected such that the corticosteroid remains dissolved or suspended when mixed with the rheology-modifying agent. In any embodiments, the rheology-modifying agent may be mixed with the corticosteroid at room temperature.

In some embodiments, the corticosteroid is first mixed with the vehicle components, and then other dry (e.g., powder) components of the composition, such as buffering agents, sweeteners and other excipients, are added and mixed prior to addition of the rheology-modifying agent.

In alternative embodiments, the corticosteroid and other dry components of the composition (e.g., buffering agents, sweeteners and other excipients) are mixed together with the vehicle components, prior to addition of the rheology-modifying agent.

In any of these embodiments, the corticosteroid and, optionally, other dry components, may be first added to water prior to addition of the vehicle components (e.g., glycerin). See, e.g. FIG. 1.

In any embodiment, the rheology-modifying agent may be added with or without additional vehicle components. In embodiments where water is present, additional water may be added after the rheology-modifying agent is added.

Thus, in some embodiments, a method of making a composition as described herein comprises (a) dissolving or suspending a corticosteroid in a vehicle and (b) mixing the corticosteroid solution or suspension with a rheology-modifying agent. In some embodiments, the methods further comprise adding water. In some embodiments, the methods further comprise adding an aqueous acidic buffer. In some embodiments, the methods further comprise adding and one or more optional excipients.

Thus, in other embodiments, a method of making a composition as described herein comprises (a) adding the corticosteroid and other dry components of the composition (e.g., buffers, sweeteners and other excipients) to water and mixing; (b) adding a first portion of the vehicle (e.g., glycerin) and mixing; (c) adding a second portion of the vehicle and the rheology-adjusting agent and mixing; and (d) adding water and mixing. See, e.g. FIG. 1.

Therapeutic Methods

Also provided herein are methods of administering a corticosteroid to a subject in need thereof, comprising orally or rectally administering to the subject a composition as described herein. In some embodiments, the method is effective to deliver the corticosteroid to the esophagus of the subject. In some embodiments, the method is effective to deliver the corticosteroid to the mucosa of the rectum or colon mucosa of the subject.

In some embodiments, such as for treatment of EoE and IBD, local delivery of the corticosteroid is therapeutically effective. That is, the corticosteroid is locally active against the condition being treated. In such embodiments, it can be advantages to avoid or minimize systemic delivery, such as to avoid unintended or unwanted systemic effects of the corticosteroid. Thus, in some embodiments, a composition as described herein is formulated for local delivery. Nevertheless, there may be circumstances (including in the context of treating EoE and IBD) where at least partial permeation of the corticosteroid into or through the mucosal tissue (e.g., esophageal, rectal, or colonic tissue) is desired for therapeutic efficacy. For example, in some embodiments, at least partial permeation into submucosal tissue may be desired for therapeutic efficacy. Thus, in some embodiments, a composition as described herein is formulated to achieve at least partial permeation into or through mucosal tissue.

In some embodiments, the method is effective for providing prolonged delivery of corticosteroid to the esophagus of the subject, such as delivery for at least 0.5 minutes, 5 minutes, or at least 10 minutes, or at least 15 minutes, or at least 20 minutes, or at least 25 minutes, or at least 30 minutes, or at least 35 minutes, or at least 40 minutes, or at least 45 minutes, or at least 50 minutes, or at least 55 minutes, or at least 60 minutes, or at least 65 minutes, or at least 75 minutes, or at least 75 minutes. In some embodiments, the method is effective for providing prolonged delivery of corticosteroid to the esophagus of the subject, such as delivery, from about 0.5 minutes to about 75 minutes, including about 0.5 minutes, about 5 minutes, about 10 minutes, about 15 minutes, about 20 minutes, about 25 minutes, about 30 minutes, about 35 minutes, about 40 minutes, about 45 minutes, about 50 minutes, about 55 minutes, about 60 minutes, about 65 minutes, about 70 minutes, and about 75 minutes.

In some embodiments, the method is effective for providing prolonged delivery of the corticosteroid to the esophagus of the subject, such as delivery for from 0.5 minutes to 12 hours, from 0.5 minutes to 8 hours, from 0.5 minutes to 6 hours, or from 0.5 minutes to 4 hours. In some embodiments, the method is effective for providing prolonged delivery of the corticosteroid to the esophagus of the subject for from 5 minutes to 12 hours, from 5 minutes to 8 hours, from 5 minutes to 6 hours, or from 5 minutes to 4 hours. In some embodiments, the method is effective for providing prolonged delivery of the corticosteroid to the esophagus of the subject for from 30 minutes to 12 hours, from 30 minutes to 8 hours, from 30 minutes to 6 hours, or from 30 minutes to 4 hours. In some embodiments, the method is effective for providing prolonged delivery of the corticosteroid to the esophagus of the subject from 45 minutes to 12 hours, from 45 minutes to 8 hours, from 45 minutes to 6 hours, or from 45 minutes to 4 hours. In some embodiments, the method is effective for providing prolonged delivery of the corticosteroid to the esophagus of the subject for from 1 to 12 hours, 1 to 8 hours, from 1 to 6 hours, or from 1 to 4 hours. In some embodiments, the method is effective for providing prolonged delivery of the corticosteroid to the esophagus of the subject, such as delivery for about 0.5 minutes, about 1 minute, about 5 minutes, about 10 minutes, about 20 minutes, about 30 minutes, about 40 minutes, about 50 minutes, about 1 hour, about 2 hours, about 3 hours, about 4 hours, about 5 hours, about 6 hours, about 7 hours, about 8 hours, about 9 hours, about 10 hours, about 11 hours, or about 12 hours.

In some embodiments, a therapeutically effective amount of the composition adheres to the esophageal or rectal mucosal for a period of time up to the time the next dose is to be administered. Thus, for twice daily dosing, a therapeutically effective amount of the composition may adhere for up to 10 hours or up to 12 hours, such as from about 1 hour to 10 hours or from about 1 hour to 12 hours. In some embodiments, for twice daily dosing, a therapeutically effective amount of the composition may adhere for about 1 hour, about 2 hours, about 3 hours, about 4 hours, about 5 hours, about 6 hours, about 7 hours, about 8 hours, about 9 hours, about 10 hours, about 11 hours, or about 12 hours. For thrice daily dosing, a therapeutically effective amount of the composition may adhere for up to 6 hours or up to 8 hours, such as from about 1 hour to 6 hours or about 1 hour to about 8 hours. In some embodiments, for thrice daily dosing, a therapeutically effective amount of the composition may adhere for about 1 hour, about 2 hours, about 3 hours, about 4 hours, about 5 hours, about 6 hours, about 7 hours, or about 8 hours. For dosing four times a day, a therapeutically effective amount of the composition may adhere for up to 4 hours or up to 6 hours, such as from about 1 hour to about 4 hours or from about 1 hour to 6 hours. In some embodiments, for dosing four times a day, a therapeutically effective amount of the composition may adhere for about 1 hour, about 2 hours, about 3 hours, about 4 hours, about 5 hours, or about 6 hours.

In some embodiments, the subject may be suffering from or at risk of developing an inflammatory condition of the upper gastrointestinal tract, particularly the esophagus. In some embodiments, the subject may be suffering from or at risk of developing eosinophilic esophagitis (EoE). In some embodiments, the subject may be a child (e.g., up to 18 years, including up to 10 years) or an adult.

In embodiments related to the treatment of EoE, suitable doses of budesonide may be up to 1 mg/day for children younger than 10 years and up to 2 mg daily for older patients, suitable doses of fluticasone may be 440 μg to 880 μg twice daily for adults and 88 μg to 440 μg two to four times a day for children (up to the maximum adult dose), and suitable doses of ciclesonide may be about to 320 μg twice a day for children. Treatment may comprise repeated doses one to four times a day, and may be continued for 1 day or longer, 3 days or longer, 7 days or longer, one week or longer, two weeks or longer, three weeks or longer, four weeks or longer, five weeks or longer, six weeks or longer, seven weeks or longer, or eight weeks or longer.

In some embodiments, the method is effective for providing prolonged delivery of corticosteroid to the rectum or colon of the subject, such as delivery for at least 0.5 minutes, at least 5 minutes, at least 10 minutes, at least 15 minutes, or at least 20 minutes, or at least 25 minutes, or at least 30 minutes, or at least 35 minutes, or at least 40 minutes, or at least 45 minutes, or at least 50 minutes, or at least 55 minutes, or at least 60 minutes, or at least 65 minutes, or at least 70 minutes, or at least 75 minutes. In some embodiments, the method is effective for providing prolonged delivery of corticosteroid to rectum or colon of the subject, such as delivery from about 0.5 minutes to about 75 minutes, including about 0.5 minutes, 5 minutes, about 10 minutes, about 15 minutes, about 20 minutes, about 25 minutes, about 30 minutes, about 35 minutes, about 40 minutes, about 45 minutes, about 50 minutes, about 55 minutes, about 60 minutes, about 65 minutes, about 70 minutes, and about 75 minutes.

In some embodiments, the method is effective for providing prolonged delivery of the corticosteroid to the rectum or colon of the subject, such as delivery for from 0.5 minutes to 12 hours, from 0.5 minutes to 8 hours, from 0.5 minutes to 6 hours, or from 0.5 minutes to 4 hours. In some embodiments, the method is effective for providing prolonged delivery of the corticosteroid to the rectum or colon of the subject for from 5 minutes to 12 hours, from 5 minutes to 8 hours, from 5 minutes to 6 hours, or from 5 minutes to 4 hours. In some embodiments, the method is effective for providing prolonged delivery of the corticosteroid to rectum or colon of the subject of the subject for from 30 minutes to 12 hours, from 30 minutes to 8 hours, from 30 minutes to 6 hours, or from 30 minutes to 4 hours. In some embodiments, the method is effective for providing prolonged delivery of the corticosteroid to the rectum or colon of the subject from 45 minutes to 12 hours, from 45 minutes to 8 hours, from 45 minutes to 6 hours, or from 45 minutes to 4 hours. In some embodiments, the method is effective for providing prolonged delivery of the corticosteroid to the rectum or colon of the subject for from 1 to 12 hours, 1 to 8 hours, from 1 to 6 hours, or from 1 to 4 hours. In some embodiments, the method is effective for providing prolonged delivery of the corticosteroid to the rectum or colon of the subject, such as delivery for about 0.5 minutes, about 1 minute, about 5 minutes, about 10 minutes, about 20 minutes, about 30 minutes, about 40 minutes, about 50 minutes, about 1 hour, about 2 hours, about 3 hours, about 4 hours, about 5 hours, about 6 hours, about 7 hours, about 8 hours, about 9 hours, about 10 hours, about 11 hours, or about 12 hours.

In some embodiments, a therapeutically effective amount of the composition adheres to the esophageal or rectal mucosal for a period of time up to the time the next dose is to be administered. Thus, for twice daily dosing, a therapeutically effective amount of the composition may adhere for up to 10 hours or up to 12 hours, such as from about 1 hour to 10 hours or from about 1 hour to 12 hours. In some embodiments, for twice daily dosing, a therapeutically effective amount of the composition may adhere for about 1 hour, about 2 hours, about 3 hours, about 4 hours, about 5 hours, about 6 hours, about 7 hours, about 8 hours, about 9 hours, about 10 hours, about 11 hours, or about 12 hours. For thrice daily dosing, a therapeutically effective amount of the composition may adhere for up to 6 hours or up to 8 hours, such as from about 1 hour to 6 hours or about 1 hour to 8 hours. In some embodiments, for thrice daily dosing, a therapeutically effective amount of the composition may adhere for about 1 hour, about 2 hours, about 3 hours, about 4 hours, about 5 hours, about 6 hours, about 7 hours, or about 8 hours. For dosing four times a day, a therapeutically effective amount of the composition may adhere for up to 4 hours or up to 6 hours, such as from about 1 hour to about 4 hours or from about 1 hour to 6 hours. In some embodiments, for dosing four times a day, a therapeutically effective amount of the composition may adhere for about 1 hour, about 2 hours, about 3 hours, about 4 hours, about 5 hours, or about 6 hours. In some embodiments, the subject may be suffering from or at risk of developing an inflammatory condition of the colon and/or rectum. In some embodiments, the subject may be suffering from or at risk of developing IBD, such as ulcerative colitis and Crohn's disease. In some embodiments, the subject may be a child (e.g., up to 18 years, including up to 10 years) or an adult.

In embodiments related to the treatment of IBD, suitable doses of budesonide may be up to 1 mg/day for children younger than 10 years and up to 2 mg daily for older patients, suitable doses of fluticasone may be 440 µg to 880 µg twice daily for adults and 88 µg to 440 µg two to four times a day for children (up to the maximum adult dose), and suitable doses of ciclesonide may be about to 320 µg twice a day for children. Treatment may comprise repeated doses one to four times a day, and may be continued for 1 day or longer, 3 days or longer, 7 days or longer, one week or longer, two weeks or longer, three weeks or longer, four weeks or longer, five weeks or longer, six weeks or longer, seven weeks or longer, or eight weeks or longer.

Also provided herein are methods of treating an inflammatory condition of the esophagus, including eosinophilic esophagitis, comprising orally administering to a subject in need thereof a composition as described herein. As noted above, a suitable subject may be suffering from one or more inflammatory conditions of the esophagus, including eosinophilic esophagitis.

Also provided herein are methods of treating an inflammatory condition of the bowel, including IBD, comprising orally or rectally administering to a subject in need thereof a composition as described herein. As noted above, a suitable subject may be suffering from one or more inflammatory conditions of the bowel, including ulcerative colitis and Crohn's disease.

The methods may comprise administering the composition as described herein one or more times per day, such as one, two, three, four, five, or more, times per day.

Also provided are uses of a corticosteroid in the preparation of a medicament for orally administering the corticosteroid to an esophagus of a subject in need thereof, wherein the medicament comprises a pharmaceutical composition as described herein. Also provided are uses of a corticosteroid in the preparation of a medicament for treating an inflammatory condition of the esophagus, such as eosinophilic esophagitis, wherein the medicament comprises a pharmaceutical composition as described herein.

Also provided are uses of a corticosteroid in the preparation of a medicament for orally or rectally administering the corticosteroid to the bowel of a subject in need thereof, wherein the medicament comprises a pharmaceutical composition as described herein. Also provided are uses of a corticosteroid in the preparation of a medicament for treating an inflammatory condition of the bowel, such as IBD, wherein the medicament comprises a pharmaceutical composition as described herein.

Also provided are pharmaceutical compositions as described herein for orally administering a corticosteroid to an esophagus of a subject in need thereof. Also provided are pharmaceutical compositions as described herein for treating an inflammatory condition of the esophagus, such as eosinophilic esophagitis.

Also provided are pharmaceutical compositions as described herein for orally administering a corticosteroid to a subject in need thereof. Also provided are rectal pharmaceutical compositions as described herein for administering a corticosteroid to a subject in need thereof. Also provided are pharmaceutical compositions as described herein for treating an inflammatory condition of the bowel, such as IBD, such as ulcerative colitis and Crohn's disease.

EXAMPLES

The following specific examples are included as illustrative of the compositions described herein. These examples are in no way intended to limit the scope of the disclosure. Other aspects of the disclosure will be apparent to those skilled in the art to which the disclosure pertains.

Example 1: Preparation of Mucoadhesive Composition

The solubility at room temperature of budesonide in water was determined to be about. 0.01 mg/ml, about 1 mg/ml in glycerin and about 10 mg/ml in propylene glycol at room temperature.

To prepare at bench scale (e.g., 1 to 1000 g batch size) a budesonide composition as described herein, budesonide was mixed with glycerin with or without propylene glycol in an ultrasound bath at room temperature. Xanthan gum was then added to the budesonide solution under stirring until a macroscopically homogeneous mixture is obtained. To the liquid composition, citric acid buffer at about pH 5, and excipients such as sucralose were added under stirring. The composition obtained was liquid at room temperature. Compositions without propylene glycol were obtained as a liquid suspension and compositions with propylene glycol were obtained as a liquid suspension or a solution depending on the amount of propylene glycol.

FIG. 1 is a schematic of an alternative exemplary manufacturing process that can be used to prepare a composition as described herein at laboratory scale (e.g., 10 kg batch size). In particular, (a) the budesonide and other dry components of the composition (e.g., buffers and sweetener) are added to an amount of water that will be about 40% w/w of the final composition and mixed; (b) an amount of vehicle (e.g., glycerin) that will be about 30% w/w of the final composition is added and mixed; (c) an amount of vehicle (e.g., glycerin) that will be about 20% w/w of the final composition and the rheology-adjusting agent (e.g., xanthan gum) are added and mixed; and (d) the remaining amount of water is added and mixed.

Example 2: Characterization of Mucoadhesive Compositions

Compositions having the following components were prepared by methodology described above:

| Component | w/w % |
| --- | --- |
| Glycerin | 50 |
| Xanthan gum | 1 |
| Citric acid buffer | q.s. |

Although the composition does not include a corticosteroid, the absence of a corticosteroid is not believed to affect the properties assessed below. Moreover, the addition of small amounts of other excipients that do not materially impact the physicochemical properties (e.g., a sweetener such as sucralose) also is not believed to significantly affect the properties described below.

Work of Adhesion

Figure 2:
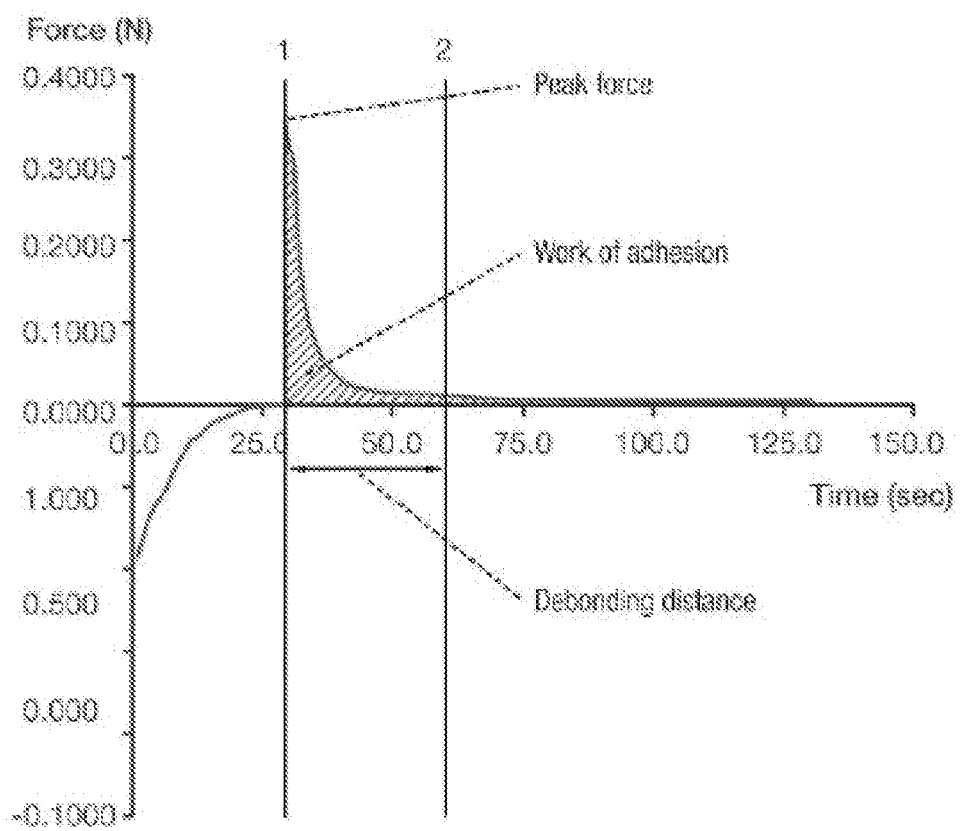
FIG. 2 is a schematic showing how Work of Adhesion is a measurement of adhesive capability.

The mucoadhesive strength of the composition is estimated by the Work of Adhesion required to separate the composition from a mucosal tissue specimen. FIG. 2 illustrates how the Work of Adhesion is a measure of adhesive capability.

Work of Adhesion is assessed as described in Skulason S. et al., Proc. Int'l. Control. Rel. Bioact. Mater., 27 (2000) #6326, using Texture Analyzer TA-TX2 (Stable Micro Systems, United Kingdom) at room temperature and the following parameters, and recording the force needed to detach the composition as a function of elongation.

Figure 3:
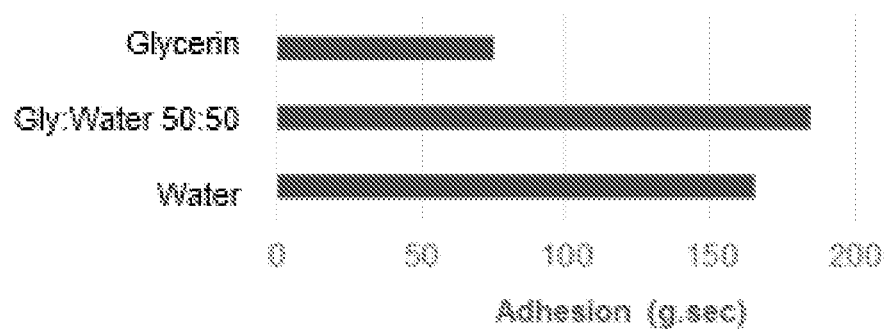
FIG. 3 shows the Work of Adhesion for the following compositions assessed in vitro: (a) glycerin; (b) glycerin and water (50:50); and (c) water.

Test sample volume: 1 mL
Test membrane: HT Tuffryn (hydrophilic polysulfone), 25 mm diameter, 0.45 μm pore size (Pall Corporation, Michigan)
Pre-Test Speed: 0.1 mm/s    Test Speed: 0.1 mm/s
Post-Test Speed: 0.1 mm/s   Applied Force: 0.2 N
Return Distance: 10 mm      Contact Time: 10 s Trigger Type: Auto - 0.05 N    Tare Mode: Auto
Data Acquisition Rate: 500 pps FIG. 3 shows the work of adhesion for the following compositions: (a) glycerin; (b) glycerin and water (50:50); and (c) water. The Work of Adhesion (area under the force/time curve) of composition (b) (a composition as described herein) was about 185 g/s.

Mucoadhesion—Porcine Mucosa

An ex vivo study in porcine mucosa was carried out to verify the mucoadhesion of the composition described above, formulated with glycerin, xanthan gum, and aqueous citric acid buffer.

Porcine oesophageal tissue was opened lengthwise from freshly slaughtered animals. The outer muscle layers were removed to expose the inner epithelial tube. The exposed tissue was stretched out on a polystyrene support sloped at 12°. 1 mL of the composition was applied on the top of the tube (start) and the time to cover 10 cm, 20 cm, and 30 cm in length (performed at room temperature) was recorded. Each measurement was replicated thrice. The extent and duration of adhesion to the porcine mucosal tissue was observed and recorded.

Figure 4:
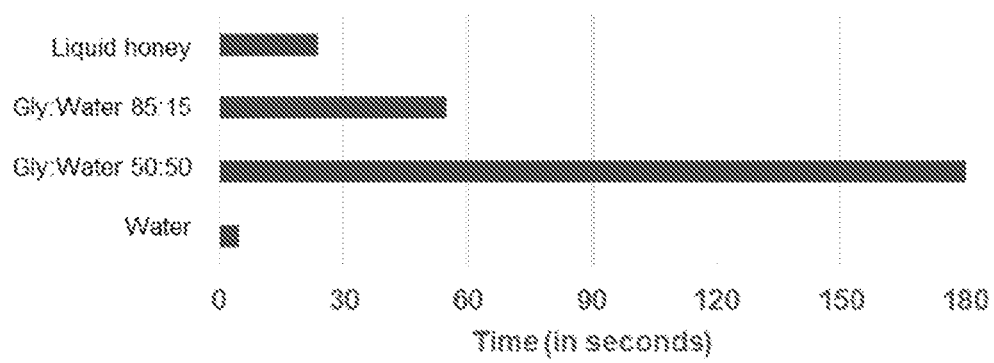
FIG. 4 shows the time (in seconds) it took for the following compositions to cover the full 30 cm length of excised pig esophagus: (a) liquid honey; (b) xanthan gum (1% w/w) in glycerin and water (85:15); (c) xanthan gum (1% w/w) in glycerin and water (50:50); and (c) water.

FIG. 4 shows the time (in seconds) it took for the following compositions to cover the full 30 cm length: (a) liquid honey; (b) xanthan gum (1% w/w) in glycerin and water (85:15); (c) xanthan gum (1% w/w) in glycerin and water (50:50); and (c) water (control). For composition C (50:50 glycerin/water), it took more than 180 seconds to cover the full 30 cm length.

Mucoadhesion—Rats

An in vivo staining study was carried out in rats to evaluate the time dependent retention/adhesion and staining intensity of a composition as described herein, after being applied to the esophagus of rats.

Wistar rats were used in this study and were divided in the following four groups where the rats from each group were sacrificed at the following time points after receiving 100 μL of the test composition: 5 minutes, 10 minutes, 15 minutes, and 20 minutes. The test composition used in this study contained the following components: 50% w/w glycerin, 1% w/w xanthan gum, 0.1% w/w sucralose; 0.1% w/w raspberry flavor, and 48.8% w/w of citric buffer at pH 5.0.

At necropsy, the composition had reached the stomach at all time points. Thus, the applied bolus was passed through the esophagus.

Figure 5A:
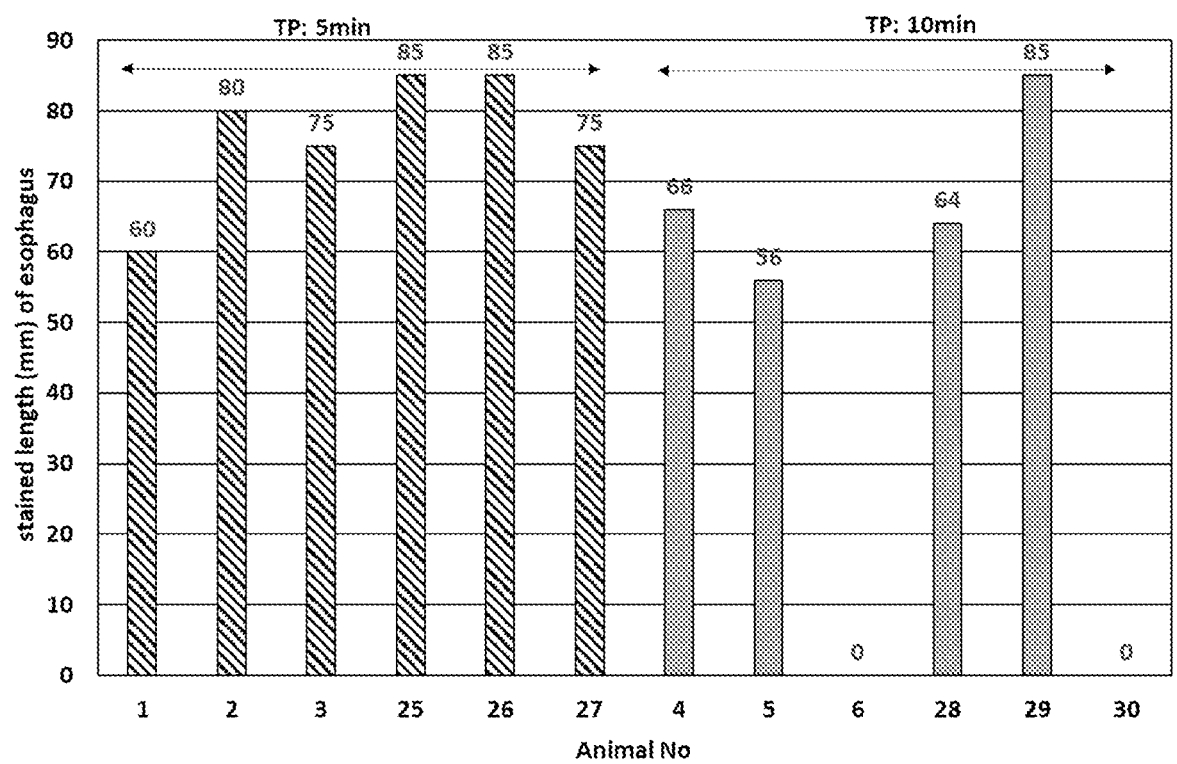
FIG. 5A shows staining and adhesion of composition assessed during an in vivo rat study (in rat esophagus) after 5 minutes and after 10 minutes.
Figure 5B:
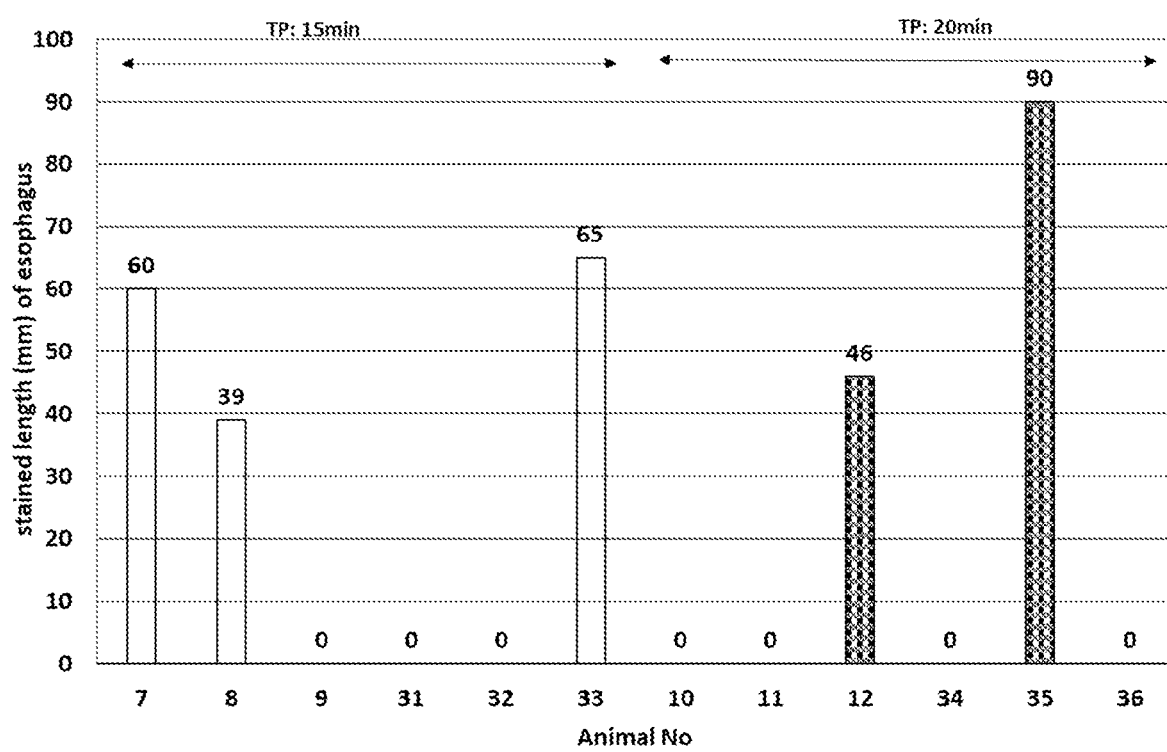
FIG. 5B shows results after 15 minutes and 20 minutes.

FIG. 5A shows the staining and adhesion of the composition in rat esophagus after 5 minutes and 10 minutes for each rat tested. FIG. 5B shows the staining and adhesion of the composition in rat esophagus after 15 minutes and 20 minutes for each rat tested. The results show that in vivo staining was still visible after 20 minutes.

In Vitro Work of Adhesion Study

To further assess mucoadhesive properties, compositions were analyzed individually and when mixed with prepared mucin solutions. The storage modulus was quantified over a range of frequencies and a single value entered into the following two equations to give the "rheological synergism parameters" $\Delta G'$ and $\Delta G'/G'$.

$$\Delta G' = G'_{(mix)} - (G'_{(sample)} + G'_{(mucin)})$$

$$\frac{\Delta G'}{G'} + 1, \text{ where } G' = G'_{(sample)} + G'_{(mucin)}$$

ΔG' is the difference between the actual storage modulus values of the samples mixed with mucin and the theoretical values, where the theoretical values are defined as the sum of the G' values of the sample and the mucin when analyzed individually.

ΔG'/G'+1 describes the relative rheological synergism, as this expresses the relative increase in G' with regards to the sample and mucin alone. A relative rheological synergism parameter of 1 would indicate that there was no increase observed when the sample was mixed with mucin, meaning there was no observable interaction with the mucin solution. Whereas a value greater than one indicates some interaction with mucin; a value of 2 for example would mean the measured viscosity of the sample mixed with mucin is double what was expected. A value of less than one indicates either the interaction is negligible and that the value should be treated as if it were 1, or if the value is significantly less than 1 then this could indicate some negative interaction occurring.

For this study, the following test compositions were used:
Composition 1: 1% w/w xanthan gum, 50% w/w glycerin, sucralose 0.1% and 48.9% citric buffer at pH 5
Composition 2: 1% w/w xanthan gum, 70% w/w glycerin, sucralose 0.1% and 28.9% citric buffer at pH 5
Composition 3: 1% w/w xanthan gum, 40% w/w glycerin, sucralose 0.1% and 58.9% citric buffer at pH 5

The mucin solutions were made using deionized water and porcine gastric mucin (III) purchased from Sigma Aldrich. Each solution was made to a concentration of 10%, the pH adjusted to 6.2 using a 0.5M HCl solution before being diluted with deionized water to a final concentration of 6% (w/w) before use.

3 g of the prepared mucin solution was mixed with an equal weight of the test composition, giving a final mucin concentration of 3% (w/w).

For control samples, the mucin solutions and test compositions were diluted to 50% (w/w) of their initial concentration using deionized water.

Testing was performed on a research rheometer (DHR2, TA Instruments) fitted with a 40 mm plate-plate measuring system, testing gap set to 200 μm. A solvent trap cover was employed to minimize drying of the sample at the exposed edges.

Testing was performed at two temperatures: 22° C. and 37° C. FIG. 6A shows the relative rheological synergism of the tested compositions with mucin at 22° C. FIG. 6B shows the relative rheological synergism of the tested compositions with mucin at 37° C.

These results also show that the mucoadhesive properties of the compositions are substantially consistent over a biologically-relevant temperature ranging from 20–40° C.

Example 3: Permeation Studies

Permeation studies were conducted to support embodiments in which at least partial permeation of the corticosteroid through, e.g., esophageal, rectal, or colonic tissue, may be desired.

In Vitro Permeation Through Human Oral Epithelium

Permeation studies using human oral epithelium (HOE)3q were conducted as follows.

100 mg of composition was applied to human oral epithelium (85 μm thickness) and permeability was tested at 15 mins, 30 mins, 45 mins, and 1 hour at room temperature (typically 20° C. to 25° C.).

The compositions assessed were:

|  | Composition A | Composition B | Composition C* | Composition D |
|---|---|---|---|---|
| Budesonide | 0.05 | 0.05 | 0.05 | 0.05 |
| Glycerin | — | 50 | — | — |
| Propylene glycol | 40 | — | — | — |
| Xanthan gum | 1 | 1 | — | — |
| Sucralose | 0.25 | — | — | — |
| qs 100 | citric buffer pH 5.0 | purified water | honey | sucralose slurry |

*Some patients use a suspension of budesonide in honey to treat EOE.

Each well of a 12-well HOE cell culture plate was filled with 1.5 mL of maintenance medium using Eppendorf multidispenser. A HOE insert was then introduced into each well and the plate was pre-incubated for 2 hours in a 35° C. water bath. After pre-incubation, using a 1.2×40 mm needle connected to a plastic syringe, about eight drops (~100 mg) of each composition was applied onto the inserts. Each condition was tested in triplicates. After 15 min, 30 min, and 45 min, on each well, the maintenance medium was totally harvested using a Pipetman into HPLC amber glass vial and replaced by fresh maintenance medium using an Eppendorf multidispenser. At 60 min, a last harvest was performed on each well without re-fill. Analysis of the samples was performed by HPLC.

Results of budesonide cumulative delivery after 1 hour permeation through HOE are reported in the table below.

| Formulation | Replicates | Mean absolute cumulative delivery [μg/cm² ± SD] | Mean relative cumulative delivery [% ± SD] | Steady-state flux [μg/cm²h] |
|---|---|---|---|---|
| A | 3 | 11.56 ± 0.33 | 11.75 ± 0.62 | 12.53 ± 0.63 |
| B | 3 | 1.03 ± 0.01 | 0.92 ± 0.07 | n/a |
| C | 3 | 0.19 ± 0.06 | 0.16 ± 0.06 | n/a |
| D | 3 | 4.10 ± 0.16 | 3.88 ± 0.58 | 4.22 ± 0.36 |

The results show that permeation is achieved when budesonide is formulated in propylene glycol, but not glycerin (or honey, or a sucralose slurry). While not being bound by theory, it is believed that the budesonide is dissolved in the propylene glycol (versus being suspended in the glycerin), facilitating permeation.

In Vitro Permeation of Budesonide Formulations Through Porcine Oesophagus

Permeation studies using porcine oesophagus were conducted as follows.

1000 mg of composition was applied to porcine esophagus (1000 μm thickness) and the permeability was tested at 4 h, 5 h, 6 h, 7 h at room temperature (typically 20° C. to 25° C.).

The compositions assessed were:

|  | E | F | G |
|---|---|---|---|
| Budesonide | 0.05 | 0.05 | 0.05 |
| Glycerin | 50 | — | — |
| Propylene glycol | — | 40 | — |
| Xanthan gum | 0.5 | 1 | — |
| Sucralose | 0.1 | 0.25 | — |
| qs 100 | purified water | citric buffer pH 5.0 | honey |

Each formulation was tested in 6 replicates (from 3 different donors). Overall, eighteen porcine oesophagus samples were used. Thickness of each sample was measured with a micrometer. The samples were mounted on vertical glass Franz diffusion cells with a receptor compartment of about 7.0 mL, a donor compartment of 3.0 mL and a diffusion area of 1.77 cm$^2$. Phosphate buffered saline (PBS) with addition of 2% w/v oleth-20, i.e. polyoxyethylene (20) oleyl ether at pH 7.4 (FGLAG-S-032), was used as receptor solution, maintained at 37° C. during the whole study, and stirred at 600 RPM. The study was performed using a Microette®Plus autosampler. After 2 hours pre-incubation of the skin samples with the receptor solution, about 1 g (565 mg/cm$^2$) of formulation was applied with a plastic syringe over the diffusion surface. Diffusion of the drug was allowed under occluded conditions during 7 hours. Receptor solution samples (1.0 mL) were automatically removed after 4 hours, 5 hours, 6 hours, and 7 hours (after 1.5 mL receptor compartment priming). The samples were collected in 2 mL HPLC amber glass vials pre-sealed with septum crimp-caps. Then samples with addition of 10 μL of a 10% trifluoroacetic acid solution were transferred into Eppendorf microtubes, and centrifuged at 13500 RPM (SIGMA 2-16 P centrifuge) during 5 min. Each supernatant (0.8 mL) was transferred in a 2 mL HPLC amber glass vial. Analysis of the samples was performed by HPLC.

The results showed that permeation is achieved when budesonide is formulated in propylene glycol, but not glycerin.

| Composition | Replicates | Mean absolute cumulative delivery* [μg/cm$^2$ ± SD] | Mean relative cumulative delivery [% ± SD] | Steady-state flux [μg/cm$^2$h] |
|---|---|---|---|---|
| E | 6 | n/a | n/a | n/a |
| F | 6 | 2.859 ± 2.214 | 0.995 ± 0.769 | n/a |
| G | 6 | n/a | n/a | n/a |

*No permeation was detected for Composition E or Composition G.

The results show that permeation is achieved when budesonide is formulated in propylene glycol, but not glycerin or honey.

Example 4: Stability Studies

Stability of compositions as described comprising 0.05% w/w budesonide, 50 or 70% w/w glycerin, 1% w/w xanthan gum, and water or aqueous citric acid buffer, and, optionally sucralose or raspberry flavor, is assessed over 24 months at 25° C. and 60% Relative Humidity and at 40° C. and 75% Relative Humidity. Results after one month at 40° C. and 75% Relative Humidity show no changes in bioadhesion, good stability against the formation of degradation products (and no impact of the sucralose or raspberry flavor).

Example 5: Additional Stability Studies

The stability of a composition as described herein comprising 0.05% w/w budesonide, 50% w/w glycerin, 1% w/w xanthan gum, 0.05% sucralose and an aqueous citric acid buffer was evaluated over 6 months at 25° C. and 60% Relative Humidity, at 30° C. and 75% Relative Humidity, and at 40° C. and 75% Relative Humidity. The tested compositions were stored in airless metering multidose dispensers.

Results of the various parameters evaluated at 0, 3, and 6 months are reported in the table below. The results show that the composition was stable. A slight drop in viscosity (<6%) was observed after 3 and 6 months at 40° C. and 75% Relative Humidity, but the viscosity remained within the target range, as did all other properties.

| Parameter | Acceptance criteria | Storage condition ° C./% RH | Storage Time (months) | | |
|---|---|---|---|---|---|
| | | | 0 | 3* | 6 |
| Description | Homogenous, translucent to slightly opalescent gel | 25/60 | NP | NP | NP |
| | | 30/75 | H, Tr | NP | NP |
| | | 40/75 | NP | H, Tr | H, Tr |
| pH | 4.8-5.8 | 25/60 | NP | NP | NP |
| | | 30/75 | 5.1 | NP | NP |
| | | 40/75 | NP | 5.1 | 5.2 |
| Viscosity | 4500-7500 mPa · s | 25/60 | NP | NP | NP |
| | | 30/75 | 6233 | NP | NP |
| | | 40/75 | NP | 5976 | 5857 |
| Specific Gravity | 1.07-1.18 | 25/60 | NP | NP | NP |
| | | 30/75 | 1.15 | NP | NP |
| | | 40/75 | NP | NP | 1.13 |

-continued

| Parameter | Acceptance criteria | Storage condition °C./% RH | Storage Time (months) | | |
|---|---|---|---|---|---|
| | | | 0 | 3* | 6 |
| BUD assay | Release: 90.0-100.0% of label claim End of Shelf-life: 90.0-100.0% of label claim | 25/60 30/75 40/75 | NP 102.5 NP | 101.0 100.8 98.8 | 101.1 100.9 98.7 |

*For the 3 month time period, the analysis of the conditions 25° C./60% RH and 30° C./75% RH were actually performed at 4 months. NP = Not Performed; H = Homogeneous; Tr = Translucent.

The table below shows the profile of two impurities that have been identified to significantly contribute to shorter shelf-life (RRT: 0.66 and RRT: 0.69) and the total sum of impurities after storage at the indicated temperatures and relative humidity. Mass spectrometry analysis suggests that these two major impurities have a very similar structure, such as being epimers, diastereoisomers or structural isomers with closely related structure. The molecular formula of these impurities in a non-charged state is $C_{25}H_{34}O_7$, which corresponds to a molecule that has one extra oxygen atom with respect to the parent budesonide molecule. As shown below, for each of the impurities evaluated, the amount of impurities are within specification after 6 months storage at 40° C. and 75% Relative Humidity.

| Impurity | Acceptance criteria | Storage condition °C./% RH | Storage Time (months) | | |
|---|---|---|---|---|---|
| | | | 0 | 3* | 6 |
| RRT: 0.66 | ≤1.0% (end of shelf-life); any individual. impurity NMT 0.2% | 25/60 30/75 40/75 | ND ND ND | 0.12 0.24 0.47 | 0.27 0.38 0.89 |
| RRT: 0.69 | ≤1.0% (end of shelf-life); any individual impurity NMT 0.2% | 25/60 30/75 40/75 | ND ND ND | 0.07 0.14 0.26 | 0.13 0.21 0.51 |
| Sum of impurities | NMT 0.2% (release); NMT 1.5% (end of shelf-life) | 25/60 30/75 40/75 | ND ND ND | 0.19 0.38 0.69 | 0.40 0.59 1.40 |

*For the 3 month time period, the analysis of the conditions 25° C./60% RH and 30° C./75% RH were actually performed at 4 months. ND = Not Determined; RRT = relative retention time; NMT = Not more than.

Additionally, microbiological testing was conducted on the compositions prior to storage. The total aerobic count (≤$10^2$ CFU/g), amount of yeasts and molds (≤$10^1$ CFU/g), amount of *Pseudomonas aeruginosa* (absent), and amount of *Staphylococcus aureus* (absent) were each within the specification stated in parenthesis.

By extrapolation of the test results above, the compositions have a minimum shelf-life of 24 months at 25° C. and 60% Relative Humidity.

Collectively, the results of these studies indicate that compositions as described herein exhibit good mucoadhesive properties, stability and permeability.

What is claimed is:

1. A mucoadhesive pharmaceutical corticosteroid composition comprising:
    (a) budesonide in an amount from 0.02 to 0.06% w/w of the composition,
    (b) glycerin in an amount from 40 to 70% w/w of the composition,
    (c) xanthan gum in an amount from 0.25 to 1.5% w/w of the composition, and
    (d) water, optionally comprising an aqueous acidic buffer,
    wherein the composition has a pH of from about 4.5 to about 7, is flowable at room temperature, and has a viscosity at room temperature of about 3000-9000 cps.

2. The composition of claim 1, further comprising propylene glycol in an amount up to 20% w/w of the composition.

3. The composition of claim 1, wherein:
    (a) the budesonide is present in an amount of about 0.05% w/w of the composition,
    (b) the glycerin is present in an amount of about 50% w/w of the composition,
    (c) the xanthan gum is present in an amount of about 1% w/w of the composition, and
    the composition optionally further comprises sucralose in an amount of about 0.05% w/w of the composition.

4. The composition of claim 1, further comprising one or more of:
    a flavoring agent,
    a preservative, and
    an antioxidant.

5. The composition of claim 1, wherein the composition is a suspension.

6. The composition of claim 1, wherein the composition is a solution.

7. The composition of claim 1, wherein the composition is substantially free of preservatives.

8. The composition of claim 1, wherein the composition exhibits a work of adhesion of 150 to 350 g/s, when assessed at room temperature using a texture analyzer and applying 1 mL of the composition to a hydrophilic polysulfone test membrane having a pore size of 0.45 pm and a diameter of 22 mm and recording the force needed to detach the composition as a function of elongation.

9. The composition of claim 1, formulated for oral administration.

10. The composition of claim 9, provided in a unit dose package containing from 1 to 10 mL of the composition.

11. The composition of claim 1, formulated for rectal administration.

12. A method of preparing a mucoadhesive pharmaceutical corticosteroid composition of claim 1, comprising preparing a solution or suspension comprising budesonide, glycerin, xanthan gum, and, optionally, aqueous acidic buffer.

13. The composition of claim 1, wherein the aqueous acidic buffer is selected from a citric acid buffer and an acetate buffer.

14. The composition of claim 1, wherein the composition has a pH of from 4.8 to about 5.8.

* * * * *